United States Patent
Kotaki

(10) Patent No.: US 8,699,176 B2
(45) Date of Patent: Apr. 15, 2014

(54) LIBRARY APPARATUS WITH MECHANISM FOR MOVING FLAG ON CELL OF MEDIUM STORING SHELF

(75) Inventor: Yoshio Kotaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1195 days.

(21) Appl. No.: 12/613,663

(22) Filed: Nov. 6, 2009

(65) Prior Publication Data

US 2010/0193452 A1 Aug. 5, 2010

(30) Foreign Application Priority Data

Feb. 3, 2009 (JP) ................................. 2009-022312

(51) Int. Cl.
*G11B 15/68* (2006.01)
(52) U.S. Cl.
USPC ........................................................ 360/92.1
(58) Field of Classification Search
CPC ........... G11B 15/6835; G11B 15/6885; G11B 17/225
USPC ........................................................ 360/92.1
See application file for complete search history.

(56) References Cited

U.S. PATENT DOCUMENTS

| | | | |
|---|---|---|---|
| 5,450,385 A | 9/1995 | Ellis et al. | |
| 5,967,339 A | 10/1999 | Utsumi et al. | |
| 6,064,543 A | 5/2000 | Tatsuda | |
| 6,671,574 B1 * | 12/2003 | Hashimoto | 700/215 |
| 6,693,759 B2 * | 2/2004 | Owens et al. | 360/69 |
| 8,046,099 B2 * | 10/2011 | Ishitsuka | 700/214 |
| 8,214,076 B2 * | 7/2012 | Sasaki | 700/218 |
| 2004/0179293 A1 * | 9/2004 | Collins et al. | 360/92 |
| 2007/0115362 A1 | 5/2007 | Sasaki | |

FOREIGN PATENT DOCUMENTS

| | | |
|---|---|---|
| JP | 5-81750 | 4/1993 |
| JP | 7-78401 | 3/1995 |
| JP | 7-98920 | 4/1995 |
| JP | 11-96631 | 4/1999 |
| JP | 2007-139617 | 6/2007 |
| JP | 2008-243356 | 10/2008 |

OTHER PUBLICATIONS

Japanese Office Action issued Feb. 8, 2011 in corresponding Japanese Patent Application 2009-022312.

* cited by examiner

*Primary Examiner* — Angel Castro
(74) *Attorney, Agent, or Firm* — Staas & Halsey LLP

(57) ABSTRACT

A storage apparatus includes a medium storing shelf having a plurality of cells for storing a recording medium, a recording and reproducing device for performing a recording and reproducing process on the recording medium, a transporting device for transporting the recording medium between the medium storing shelf and the recording and reproducing device, a flag provided on the cell and used for obtaining position information for transporting the recording medium, and a flag moving mechanism for moving the flag to retracted position which does not hinder mounting of recording medium into the cell.

7 Claims, 26 Drawing Sheets

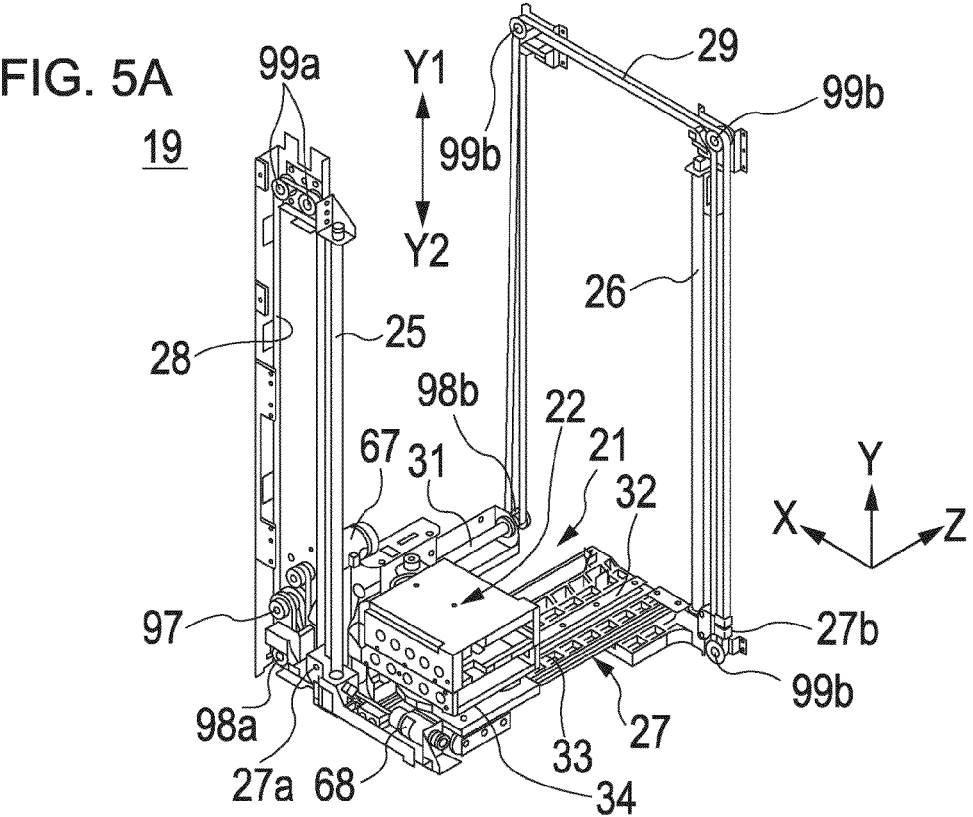
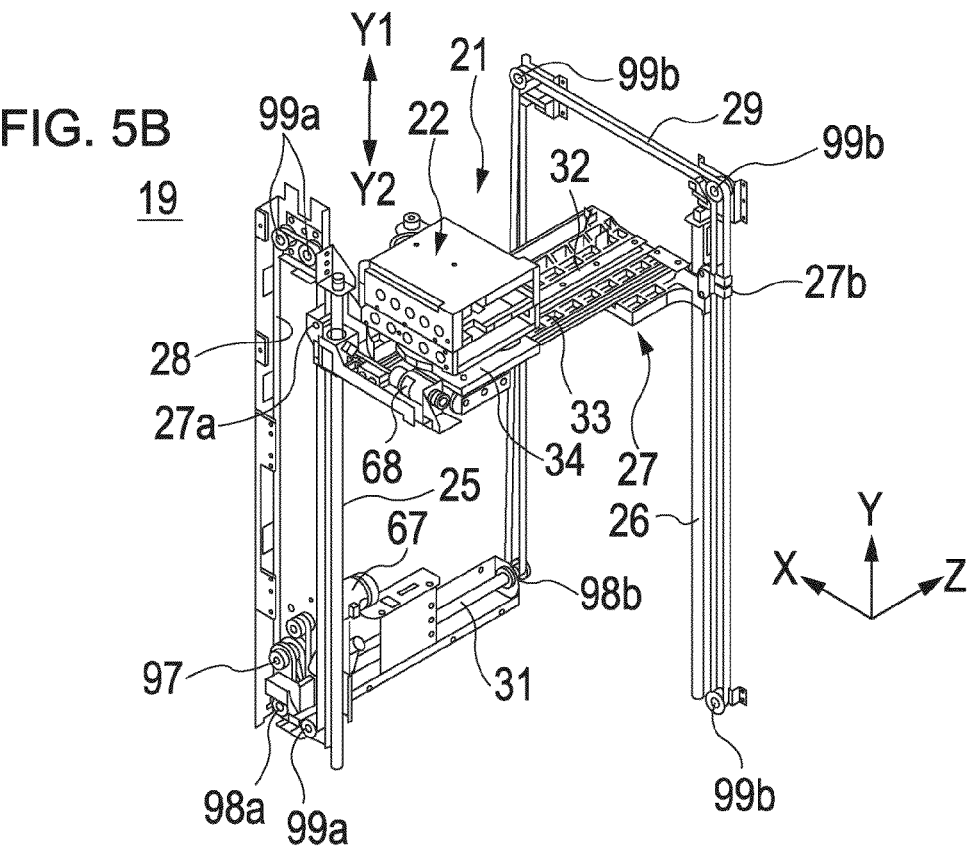

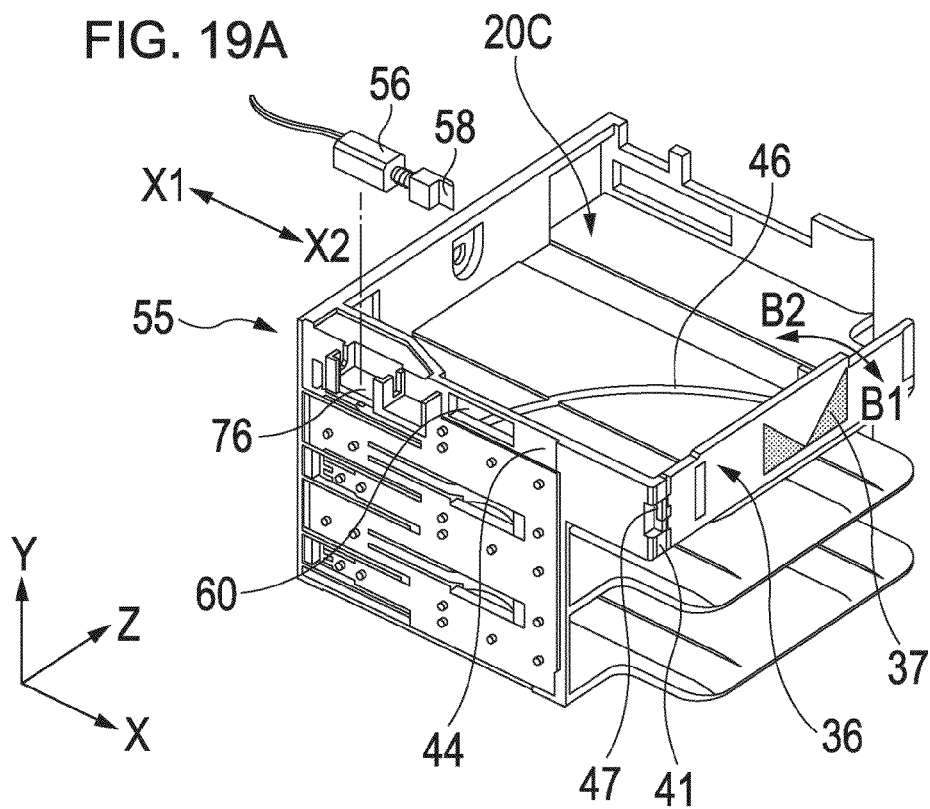
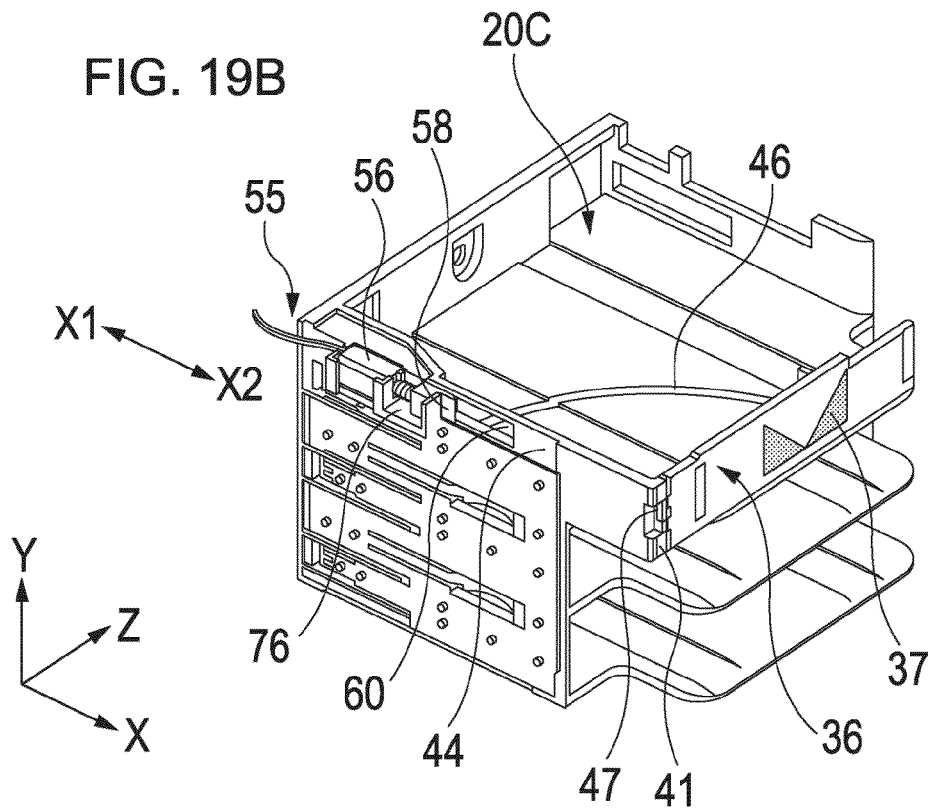

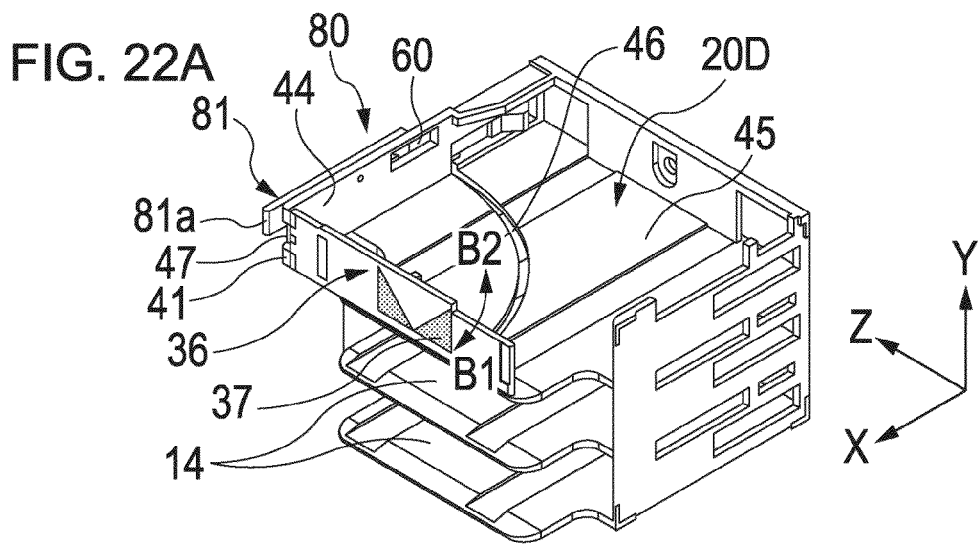
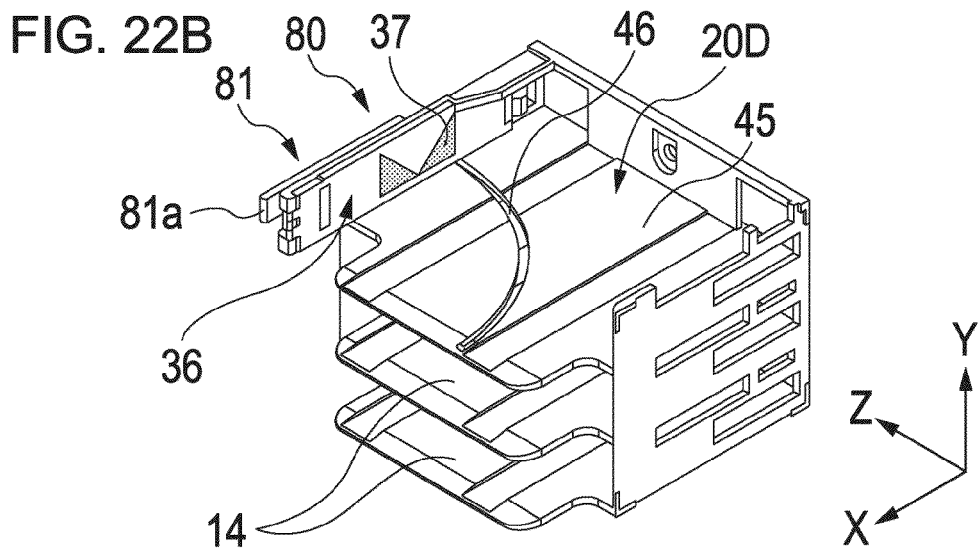
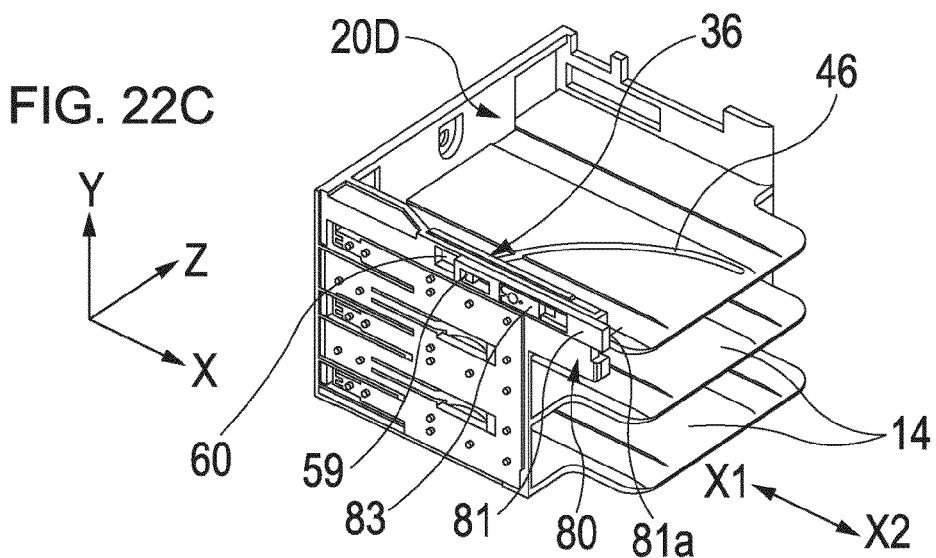

LIBRARY APPARATUS WITH MECHANISM FOR MOVING FLAG ON CELL OF MEDIUM STORING SHELF

CROSS-REFERENCE TO RELATED APPLICATIONS

This application is based upon and claims the benefit of priority of the prior Japanese Patent Application No. 2009-22312, filed on Feb. 3, 2009, the entire contents of which are incorporated herein by reference.

FIELD

The embodiments discussed herein are related to a library apparatus, more specifically, to the library apparatus provided with a flag on a cell for storing a recording medium.

BACKGROUND

In general, there is a magnetic tape apparatus having a magnetic tape as a recording medium as one of external storage apparatuses for a computer. As a prevailing magnetic tape apparatus, a magnetic tape cartridge employing a tape having a width of 0.5 inch and being loaded with the tape pulled out automatically from a reel in a case is used extensively. The magnetic tape cartridges by a required number are loaded (entry) in a magnetic tape library apparatus (hereinafter, referred to as a library apparatus) and are loaded selectively in a magnetic recording and reproducing device for writing and reading data.

The library apparatus includes a medium storing shelf having a plurality of cells for storing magnetic tape cartridges, the magnetic recording and reproducing device configured to perform a data recording and reproducing process, and a transporting device configured to transport the magnetic tape cartridges between the medium storing shelf and the magnetic recording and reproducing device.

In the case of a large sized library apparatus, since the medium storing shelf having a number of cells arranged in row and a plurality of magnetic recording and reproducing devices are connected to each other and assembled into a casing (housing), a large margin of an error which occurs at the time of assembly (hereinafter, referred to as an assembly error) is resulted. When the assembly error is large as described above, accurate positioning of the transporting device with respect to the respective cells in the medium storing shelf is difficult only with values estimated in a designing stage.

Accordingly, as means for correcting the positional displacement as described above, the library apparatus is provided with a position detecting device which detects a relative position between the medium storing shelf and the transporting device, and detects a relative position between the magnetic recording and reproducing devices and the transporting device. The position detecting device includes a flag provided on a front surface portion of the cells and the magnetic recording and reproducing devices, and an image pickup device provided on the transporting device and configured to pick up an image of the flag. Then, the position detecting device obtains an amount of positional displacement on the basis of image data of the flag the image of which is picked up by the image pick up device, and reflects the amount of displacement at the time of transporting process as a correcting amount, so that accurate positioning is achieved.

In the related art, as illustrated in FIG. 1A and B, a flag 1 for performing the position detection is fixed to a cell 3 using a holder 2 or the like. Also, in order to achieve the accurate positioning, at least three positions are required as positions to dispose the flag, so that the flags 1 are fixed to a plurality of cells 3 of the medium storing shelf in general (refer to Japanese Laid-open Patent Publication No. 2007-139617).

As known publicly, increase in number of magnetic tape cartridges to be stored in the library apparatus and downsizing thereof are desired. However, in the method of fixing the flags on the cells as in the related art, the magnetic tape cartridges cannot be mounted on the cells having the flag thereon. In other words, assuming that the number of the cells provided in the medium storing shelf is N, the number M of storage of the magnetic tape cartridges which can be stored actually in the medium storing shelf is M=N−3.

Therefore, the method of disposing the flags in the related art has a problem that the efficiency of storage of the magnetic tape cartridges in the medium storing shelf is lowered (in the example illustrated above, the efficiency is lowered by three cartridges). Also, when an attempt is made to store the N pieces of magnetic tape cartridges, it is necessary to provide three cells separately in the medium storing shelf and, in this case, there arises a problem of upsizing of the library apparatus.

SUMMARY

According to an aspect of the invention, the library apparatus includes a medium storing shelf having a plurality of cells for storing a recording medium, a recording and reproducing device for performing a recording and reproducing process on the recording medium, a transporting device for transporting the recording medium between the medium storing shelf and the recording and reproducing device, a flag provided on the cell and used for obtaining position information for transporting the recording medium, and a flag moving mechanism for moving the flag to retracted position which does not hinder mounting of recording medium into the cell.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 1A to 1B illustrate a library apparatus as an example of a related art, in which FIG. 1A is a perspective view, and FIG. 1B is an exploded perspective view.

FIGS. 4A to 4B are illustrate a magnetic tape cartridge in which FIG. 4A is a perspective view viewed from the front, FIG. 4B is a perspective view viewed from the side.

FIGS. 5A to 5B are a drawing for explaining a Y-direction transporting mechanism, in which FIG. 5A is a perspective view illustrating a state in which a hand device is moved downward, and FIG. 5B is a perspective view illustrating a state in which the hand device is moved upward.

FIGS. 6A to 6B are a drawing for explaining a Z-direction transporting mechanism in which FIG. 6A is a perspective view illustrating a state in which the hand device is moved in a Z2 direction, and FIG. 6B is a perspective view illustrating a state in which the hand device is moved in a Z1 direction.

FIGS. 7A to 7B are a drawing for explaining the hand device, in which FIG. 7A is a perspective view viewed from obliquely above, and FIG. 7B is a perspective view viewed from the front.

FIGS. 9A to 9B are a drawing for explaining a medium storing shelf, in which FIG. 9A is a perspective view illustrating a state in which a flag is displayed, and FIG. 9B is a perspective view illustrating a state in which the flag is in the retracted position.

FIGS. 11A to 11C are a drawing for explaining a flag mounting cell provided in the library apparatus according to the first embodiment of the present invention in which FIG. 11A is a perspective view of a state in which the flag is displayed, which is viewed from the front, FIG. 11B is a perspective view of a state in which the flag is in the retracted position, which is viewed from the front, and FIG. 11C is a perspective view of a state in which the flag is displayed, which is viewed from the back.

FIG. 16B is a perspective view of a state in which the flag is in the retracted position, which is viewed form the front.

FIGS. 18A to 18B are a drawing for explaining the flag-attached cell provided in the library apparatus according to a third embodiment of the present invention in which FIG. 18A is a perspective view of a state in which the flag is displayed, which is viewed from the front, and FIG. 18B is a perspective view of a state in which the flag is in the retracted position, which is viewed from the front.

FIGS. 19A to 19B are a drawing for explaining the flag-attached cell provided in the library apparatus according to the third embodiment of the present invention in which FIG. 19A is an exploded perspective view illustrating a side where a first locking mechanism is disposed, and FIG. 19B is a perspective view illustrating the side where the first locking mechanism is disposed.

FIGS. 20A to 20B are a drawing for explaining a solenoid provided in the library apparatus according to the third embodiment of the present invention in which FIG. 20A is a perspective view illustrating the appearance, and FIG. 20B is an exploded perspective view.

FIGS. 21A to 21B are a drawing for explaining an operation of the first locking mechanism, in which FIG. 21A is a perspective view illustrating a state of a locked state in which a locking claw engages a locking strip, and FIG. 21B is a perspective view illustrating a state in which the lock is released.

FIGS. 22A to 22C are a drawing for explaining the flag-attached cell provided in the library apparatus according to a fourth embodiment of the present invention in which FIG. 22A is a perspective view of a state in which the flag is displayed, which is viewed from the front, FIG. 22B is a perspective view of a state in which the flag is in the retracted position, which is viewed from the front, and FIG. 22C is a perspective view of a state in which the flag is in the retracted position, which is viewed from the back.

FIGS. 24A to 24B are a drawing illustrating a second locking mechanism provided in the library apparatus according to the fourth embodiment, in which FIG. 24A is a perspective view illustrating the locked state in which the locking strip engages a locking claw portion, and FIG. 24B is a perceptive view illustrating a state in which the lock is released.

FIGS. 25A to 25B are a drawing illustrating the second locking mechanism provided in the library apparatus according to the fourth embodiment of the present invention in which FIG. 25A is a perspective view illustrating a state in which the locking strip is apart from a lock lever, and FIG. 25B is an exploded perspective view of the second locking mechanism.

DESCRIPTION OF EMBODIMENTS

Figure 1A:
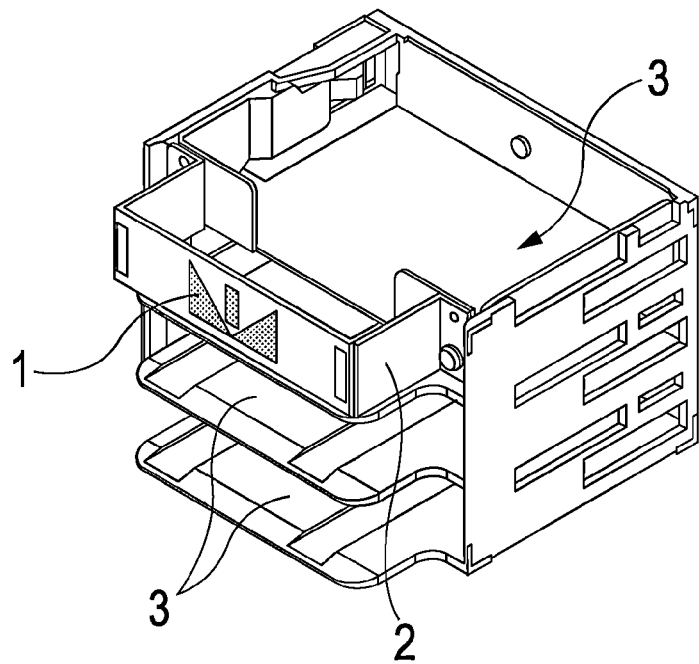

Referring now to the drawings, embodiments will be described.

Figure 2:
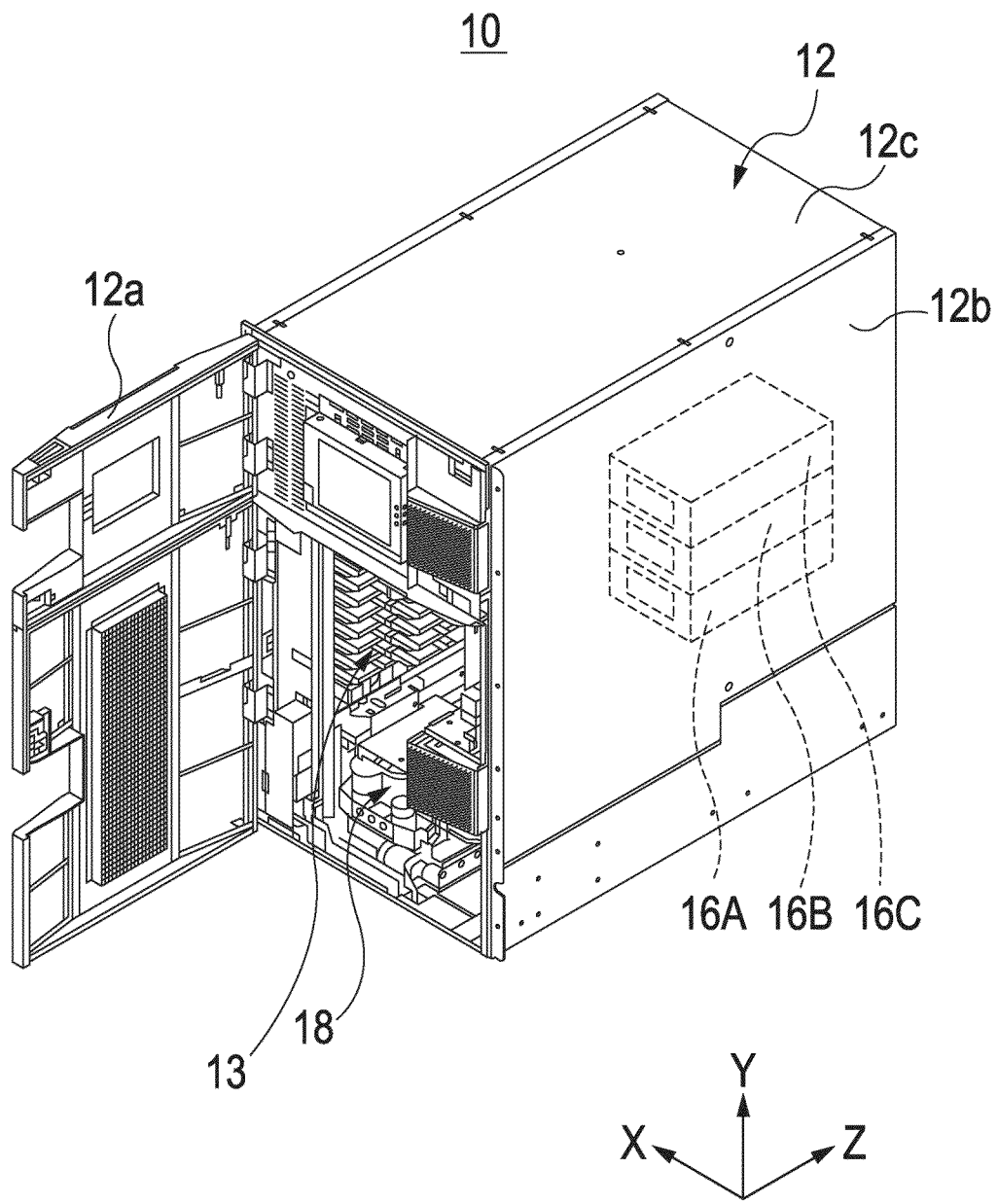
FIG. 2 is an appearance view of the library apparatus according to a first embodiment of the present invention in a state in which a lid member is opened.
Figure 3:
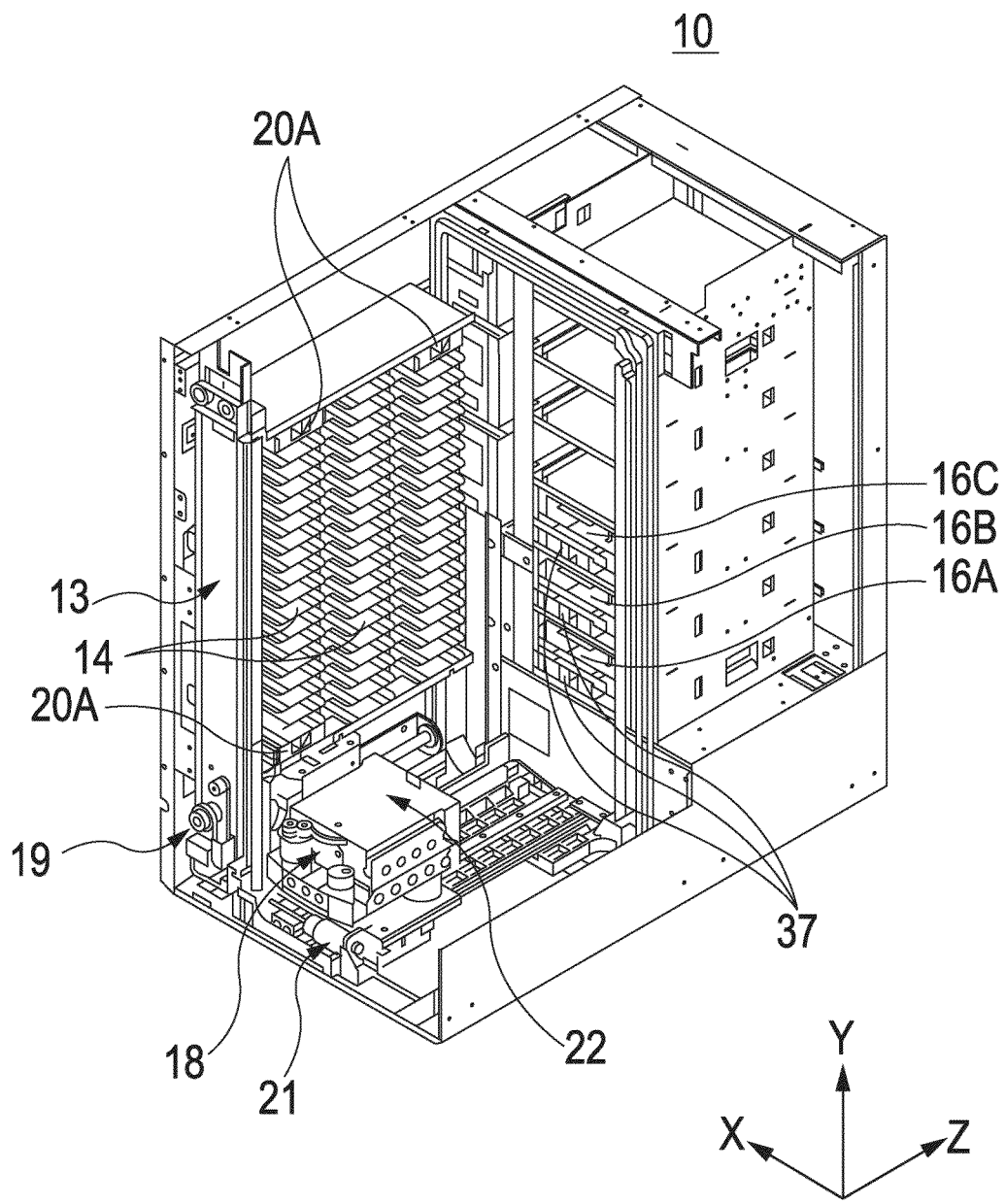
FIG. 3 is a perspective view of the library apparatus according to the first embodiment of the present invention in a state in which a casing is removed.

FIG. 2 and FIG. 3 illustrate a library apparatus 10 according to a first embodiment. FIG. 2 is a drawing illustrating an appearance of the library apparatus 10 in a state in which a lid member 12a is opened, and FIG. 3 is a perspective view of the library apparatus 10 in a state in which a side panel 12b and a top panel 12c of a casing 12 are removed. The library apparatus 10 according to this embodiment employs a magnetic tape cartridge 15 as a recording medium to be stored. In FIG. 2 and FIG. 3, and in respective drawings used in the following descriptions, X-direction, Y-direction, and Z-direction are directions indicated by arrows in the drawings.

As illustrated in FIG. 2, the library apparatus 10 includes the casing 12, a medium storing shelf 13, magnetic tape driving devices 16A to 16C, and a transport robot 18 and so on. The casing 12 is a member for storing the medium storing shelf 13, the magnetic tape driving devices 16A to 16C, the transport robot 18, and so on, and the lid member 12a is provided in the front so as to be openable and closable.

Figure 9A:
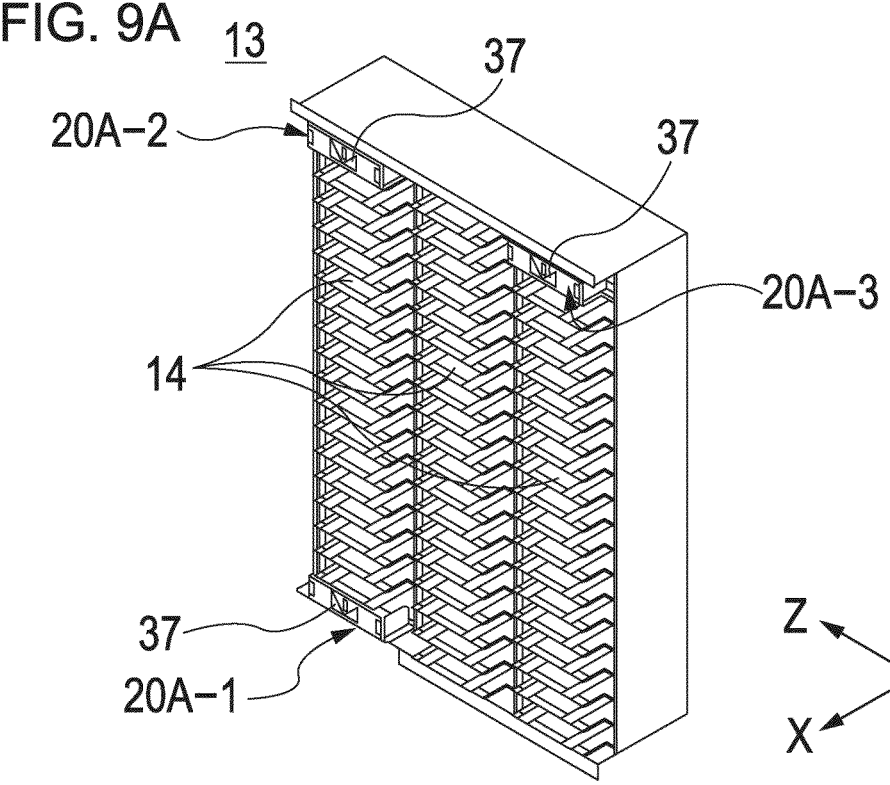
Figure 9B:
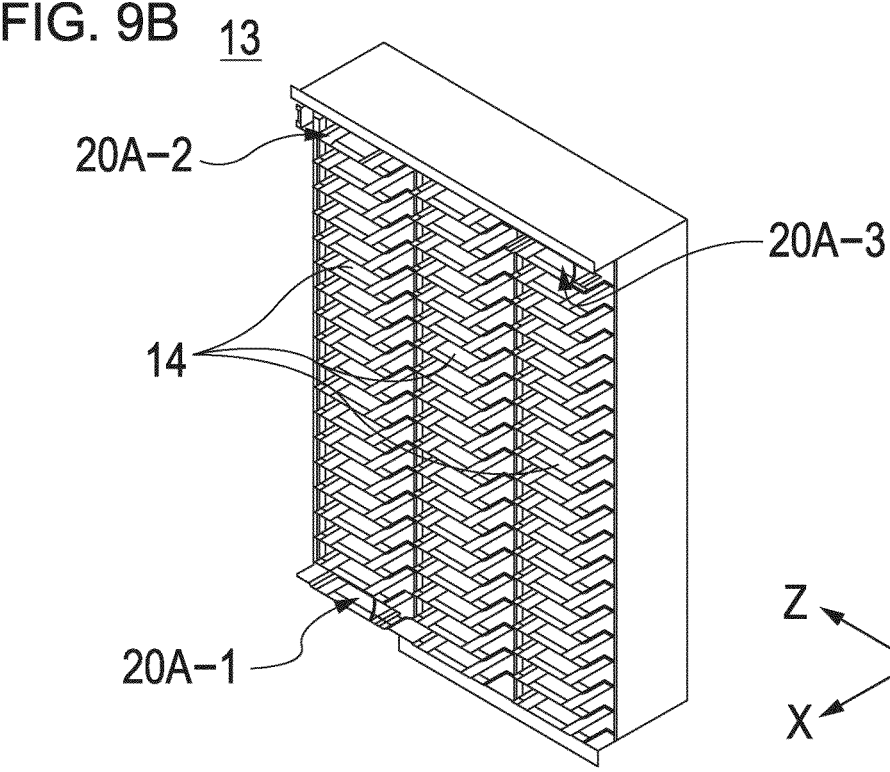

The medium storing shelf 13 is provided with a plurality of cells 14 as illustrated in FIG. 3 and FIGS. 9A to 9B. The cells 14 are shelves where the magnetic tape cartridges 15 are stored. Mounting and demounting of the magnetic tape cartridges 15 to the cells 14 are performed by the transport robot 18 which will be described later. The medium storing shelf 13 includes the cells 14 at a high density so as to allow storage of a large number of the magnetic tape cartridges 15 without wasting a space. The medium storing shelf 13 according to this embodiment includes fifty-seven cells 14 in three rows horizontally and in nineteen rows vertically.

From among the plurality of cells 14, a cell in a lowermost row in the Y-direction on the left end in FIG. 9A and FIG. 9B, and cells positioned on both ends in a topmost row in the Y-direction are provided with a flag 37. In the following description, the cell in the lowermost row in the Y-direction on the left end in FIGS. 9A to 9B are referred to as a flag-attached cell 20A-1 and the cells positioned on the both ends in the topmost row in the Y-direction are referred to as cells 20A-2, 20A-3. For the convenience of description, the flag-attached cells 20A-1 to 20A-3 are described later in detail.

Figure 4A:
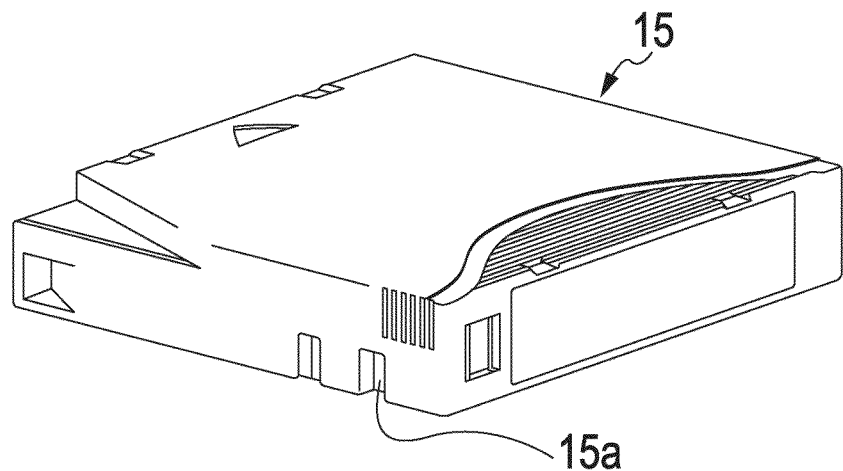
Figure 4B:
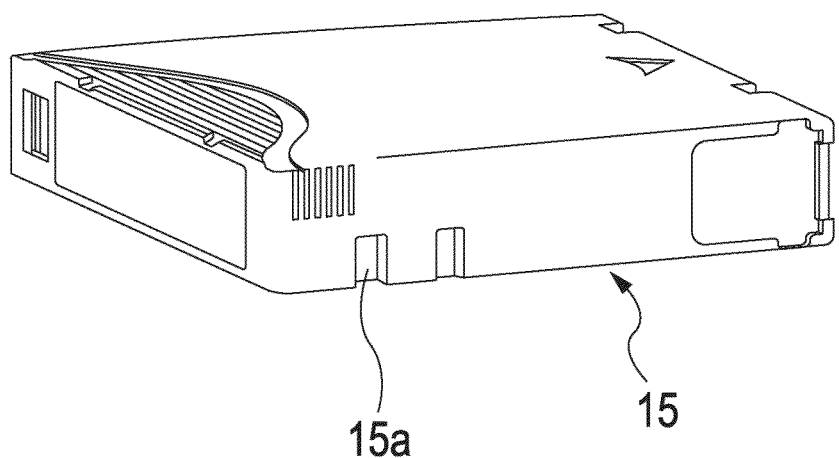

As described above, the magnetic tape cartridges 15 are stored in the respective cells 14, 20A-1 to 20A-3 provided in the medium storing shelf 13. In this embodiment, an example in which LTO (Linear Tape-Open) cartridges are employed as the magnetic tape cartridges 15 is illustrated. The magnetic tape cartridge 15 of this LTO cartridge type includes recessed receiving portions 15a formed on both sides in the front as illustrated in FIGS. 4A to 4B in an enlarged scale.

Although the example in which the magnetic tape cartridge 15 of the LTO cartridge type is used as the recording medium to be stored in the medium storing shelf 13 is described in this embodiment, the type of the storage medium is not limited thereto. For example, this embodiment described below may be applied to the magnetic tape cartridges of types other than the LTO cartridge type, or recording medium other than the magnetic tape (disk-type recording medium or the like).

The magnetic tape driving devices 16A to 16C as the recording and reproducing devices are devices to perform the recording and reproducing process for the magnetic tapes in the magnetic tape cartridges 15. Mounting and demounting of the magnetic tape cartridges 15 are performed by the transport robot 18, described later, with respect to the magnetic tape driving device 16A. Although the mounting and demounting of the magnetic tape cartridges 15 with respect to the medium storing shelf 13 are performed in the X-direction, mounting and demounting of the magnetic tape cartridges 15 with respect to the magnetic tape driving devices 16A to 16C are performed in the Z-direction.

In this embodiment, the number of the magnetic tape driving devices 16A to 16C to be installed is set to the same number as the number of the flag-attached cells 20A-1 to 20A-3 (three in this embodiment) provided in the medium storing shelf 13. However, the number of the magnetic tape driving devices 16A to 16C to be installed is not limited thereto as long as it is not less than the number of the flag-attached cells 20A-1 to 20A-3. The reason will be descried later for the sake of convenience.

The transport robot 18 is a transporting device configured to transport the magnetic tape cartridges 15 between the medium storing shelf 13 and the magnetic tape driving devices 16A to 16C. The transport robot 18 includes a Y-direction transporting mechanism 19, a Z-direction transporting mechanism 21, and a hand device 22.

The Y-direction transporting mechanism 19 has a function to move a first base 27 on which the Z-direction transporting mechanism 21 and the hand device 22 are mounted in the Y1 and Y2 directions. FIGS. 5A to 5B are a drawing illustrating the Y-direction transporting mechanism 19 in an enlarged scale. FIG. 5A is a perspective view illustrating a state in which the hand device is moved downward, and FIG. 5B is a perspective view illustrating a state in which the hand device is moved upward.

The Y-direction transporting mechanism 19 includes first and second Y-direction rails 25, 26, first and second Y-direction belts 28, 29, and a Y-axis electric motor 67. The first and second Y-direction rails 25, 26 are provided upright on a bottom portion of the casing 12. The first and second Y-direction rails 25, 26 slidably engage sliding portions 27a, 27b provided on the first base 27 on a diagonal line. Therefore, the first base 27 is guided to the first and second Y-direction rails 25, 26, and is moved (slid) in the directions indicated by arrows Y1 and Y2.

Figure 10:
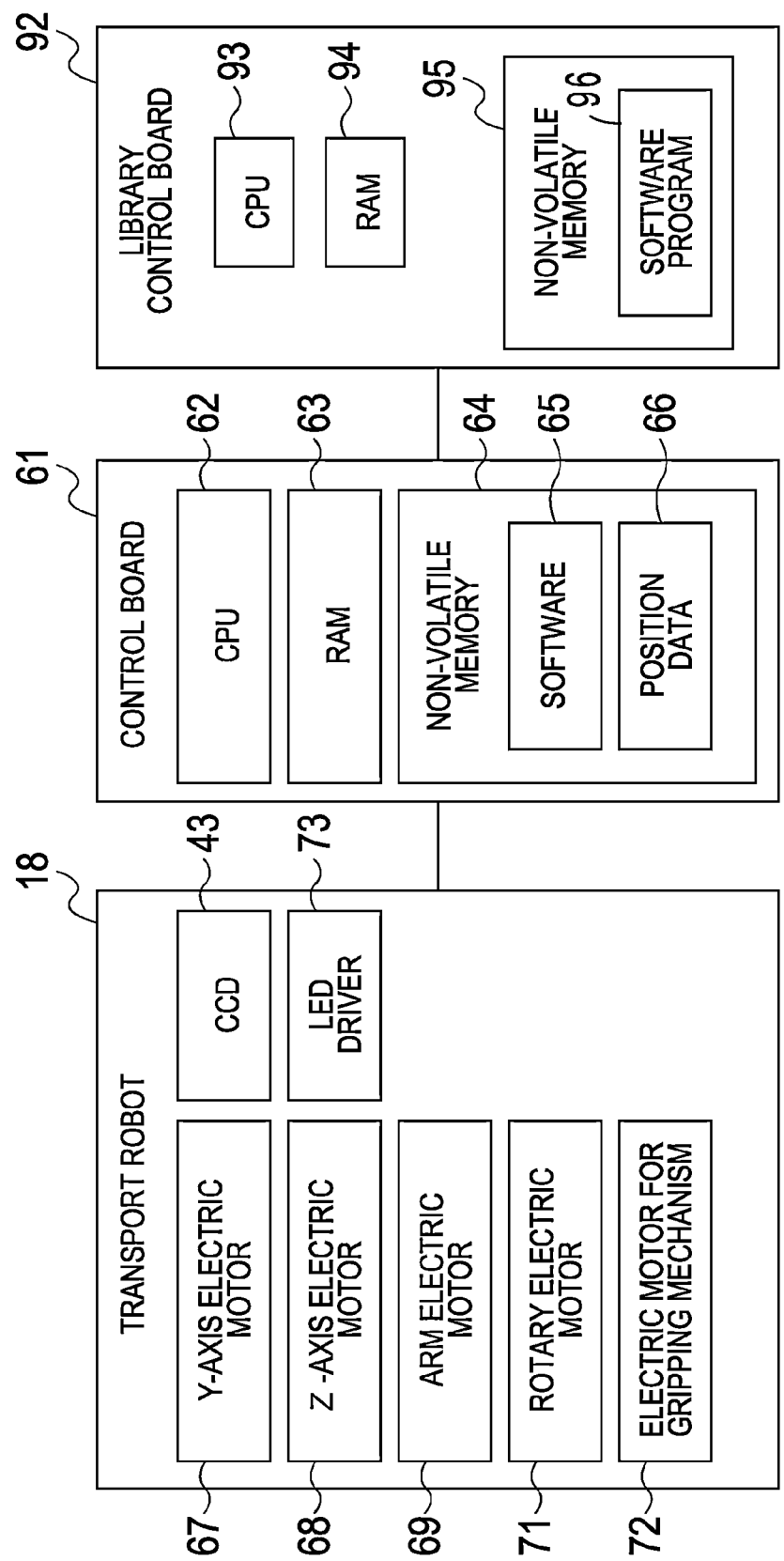
FIG. 10 is a block diagram illustrating a control system provided on the library apparatus according to the first embodiment of the present invention.

The Y-axis electric motor 67 is a stepping motor and is connected to a library control board 92 described later via a control board 61 or the like (see FIG. 10). Therefore, the Y-axis electric motor 67 is drive-controlled by a CPU 93 provided on the library control board 92. The Y-axis electric motor 67 is connected to drive pulleys 98a, 98b via a decelerating mechanism 97. Therefore, the rotation of the Y-axis electric motor 67 is transmitted to the drive pulleys 98a, 98b after being decelerated by the decelerating mechanism 97. The drive pulley 98b is connected to the decelerating mechanism 97 via a shaft 31.

In contrast, a plurality of guide pulleys 99a, 99b are disposed at predetermined positions of the first and second Y-direction rails 25, 26 and the casing 12. The first Y-direction belt 28 forms a predetermined loop by the drive pulley 98a and the guide pulley 99a. The second Y-direction belt 29 forms a predetermined loop by the drive pulley 98b and the guide pulley 99b. In addition, the sliding portion 27a provided on the first base 27 is connected to the first Y-direction belt 28, and the sliding portion 27b is connected to the second Y-direction belt 29.

When the Y-axis electric motor 67 is driven and the rotation thereof is transmitted to the drive pulleys 98a, 98b, the first and second Y-direction belts 28, 29 are moved by being guided by the respective pulleys 98a, 98b, 99a, and 99b. As described above, the sliding portions 27a, 27b of the first base 27 is connected to the first and second Y-direction belts 28, 29. Therefore, the first base 27 having the hand device 22 mounted thereon performs upward and downward movement in association with the movement of the first and second Y-direction belts 28, 29.

Figure 6A:
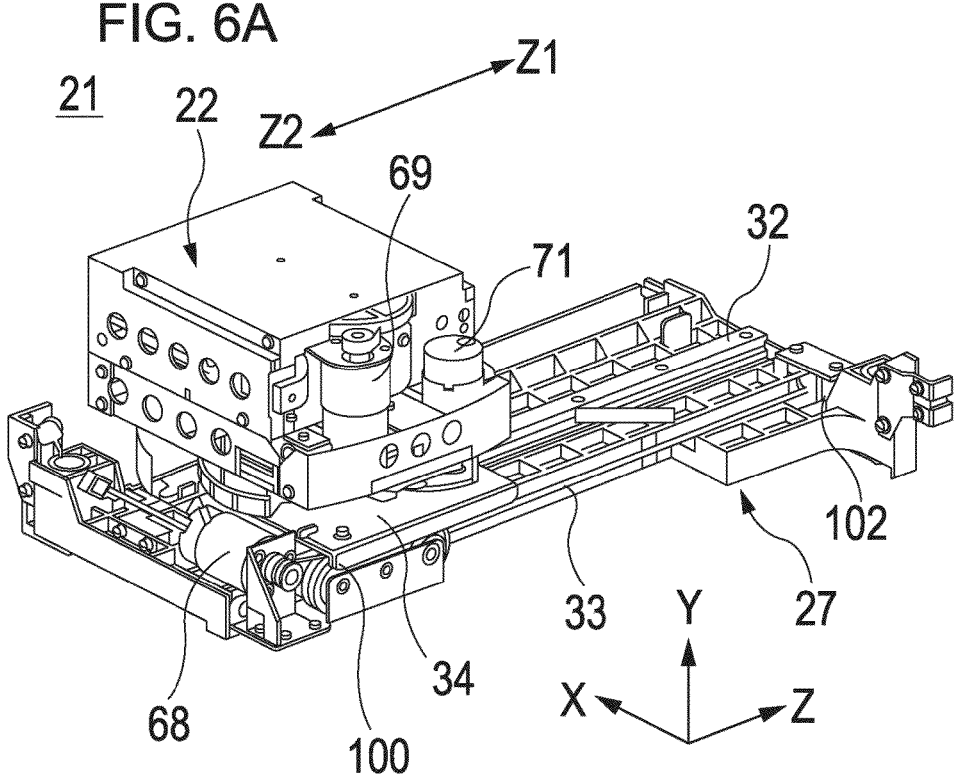
Figure 6B:
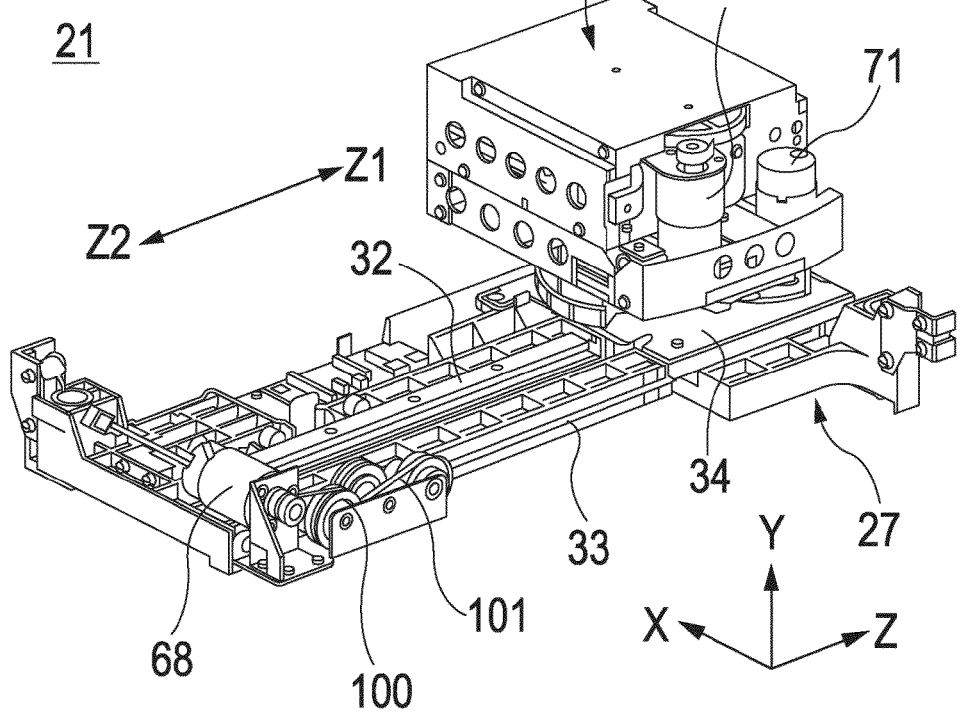

The Z-direction transporting mechanism 21 has a function to move the hand device 22 on the first base 27 horizontally in the Z1, Z2 directions. FIG. 6A is a perspective view illustrating a state in which the hand device 22 is moved in the direction indicated by an arrow Z2, and FIG. 6B is a perspective view illustrating a state in which the hand device 22 is moved in the direction indicated by an arrow Z1.

The Z-direction transporting mechanism 21 includes a Z-direction rail 32, a Z-direction belt 33, a second base 34, and a Z-axis electric motor 68. The Z-direction rail 32 is provided integrally with the first base 27, and is provided so as to extend in the Z1, Z2 direction. The second base 34 on which the hand device 22 is mounted engage the Z-direction rail 32. The second base 34 is guided by the Z-direction rail 32, and is moved (slid) in the Z1, Z2 directions.

The Z-axis electric motor 68 is a stepping motor and is connected to the library control board 92 described later via the control board 61 or the like (see FIG. 10). Therefore, the Z-axis electric motor 68 is drive-controlled by the CPU 93 provided on the library control board 92. The Z-axis electric motor 68 is connected to a drive pulley 101 via a decelerating mechanism 100. Therefore, the rotation of the Z-axis electric motor 68 is transmitted to the drive pulley 101 after decelerated by the decelerating mechanism 100.

The drive pulley 101 is provided on a side portion of the first base 27 in the vicinity of an end portion in the Z2 direction, and a guide pulley 102 is provided on the side portion of the first base 27 in the vicinity of the end portion in the Z1 direction. The Z-direction belt 33 is wound between the drive pulley 101 and the guide pulley 102. The second base 34 is connected to the Z-direction rail 32.

When the Z-axis electric motor 68 is driven and the drive pulley 101 is rotated, the second base 34 connected to the Z-direction belt 33 is guided by the Z-direction rail 32, and is moved in the Z1, Z2 directions. Therefore, the hand device 22 mounted on the second base 34 is also moved in the Z1, Z2 direction on the first base 27.

Figure 7A:
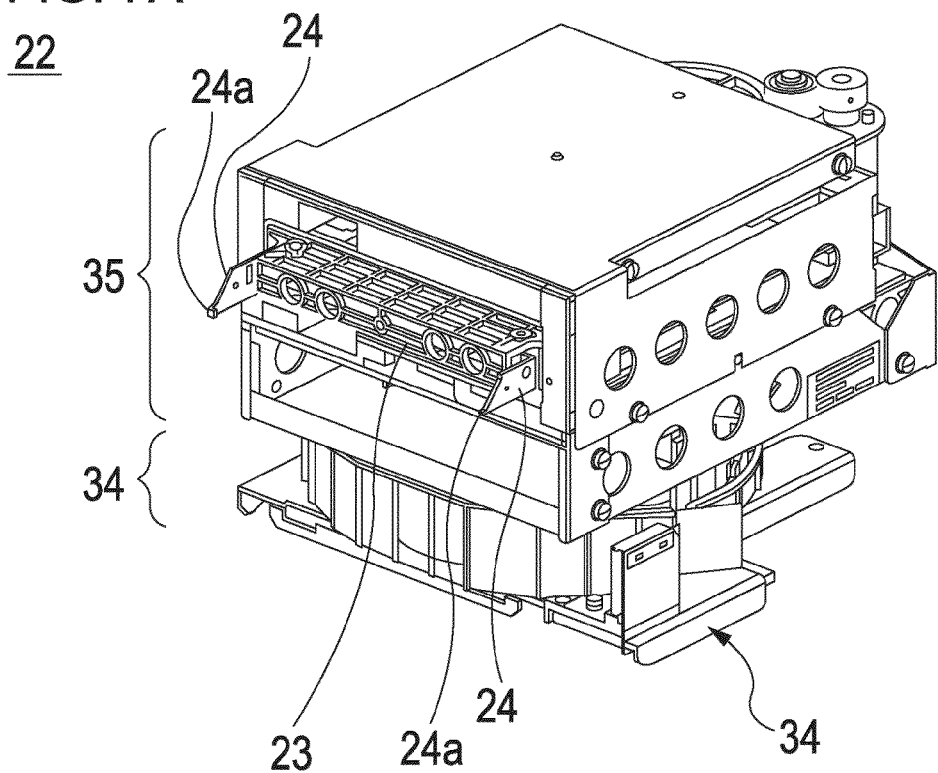
Figure 7B:
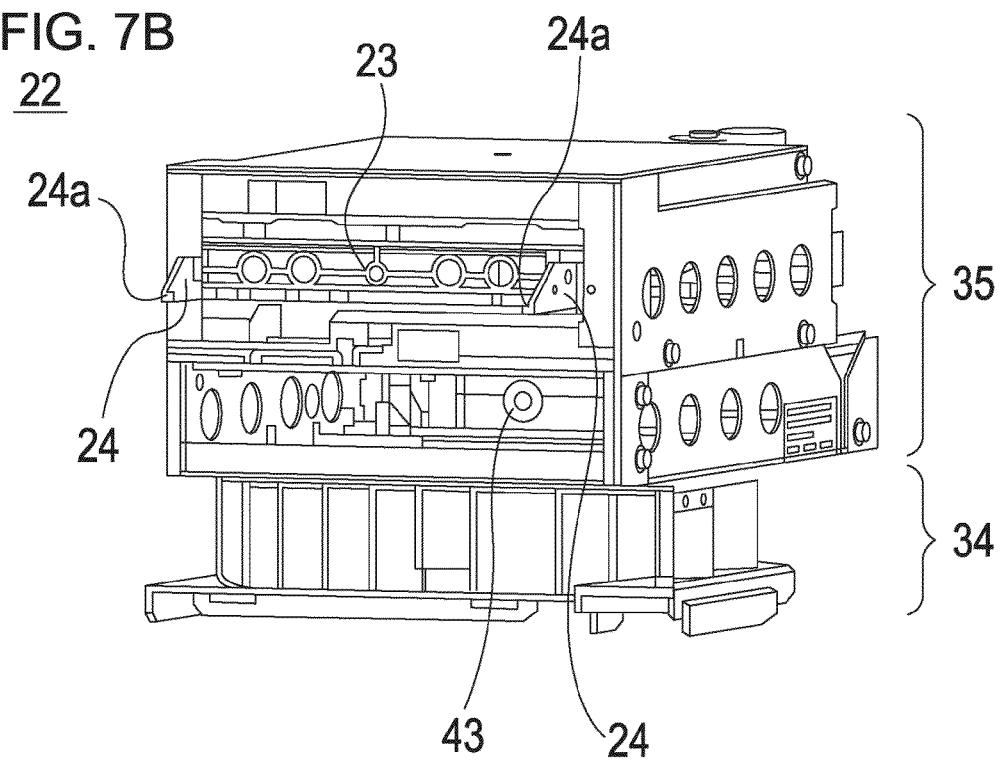

The hand device 22 includes the second base 34 and an apparatus body 35 as illustrated in FIGS. 7A to 7B in an enlarged scale. As described above, the second base 34 is moved in the Z1, Z2 directions on the first base 27 by being driven by the Z-axis electric motor 68 provided on the first base 27 and guided by the Z-direction rail 32.

Figure 8:
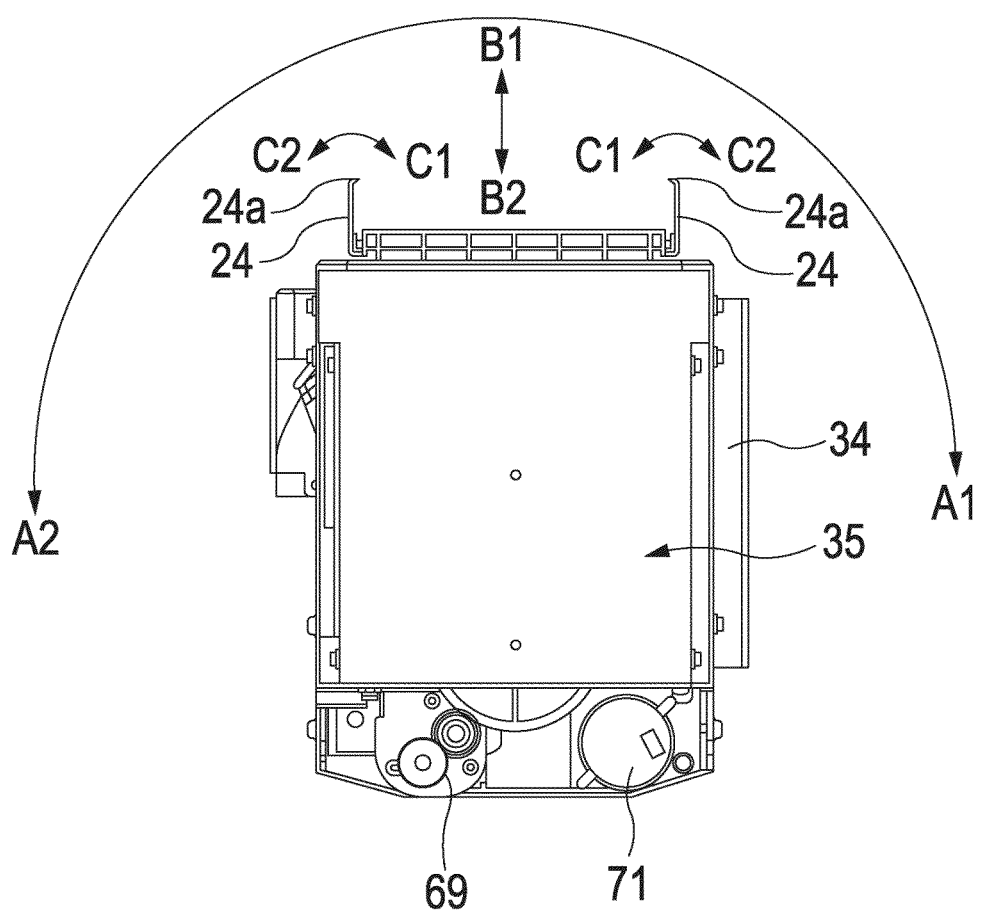
FIG. 8 is a drawing for explaining a rotation of an apparatus body of the hand device.

The apparatus body 35 is rotatably mounted on the second base 34. The apparatus body 35 includes a rotary electric motor 71, and is rotated in the directions illustrated by arrows A1, A2 with respect to the second base 34 by the rotation of the rotary electric motor 71 as illustrated in FIG. 8. As described above, the second base 34 is attached to the first base 27. Therefore, by the rotation of the apparatus body 35 with respect to the second base 34, the apparatus body 35 is rotated with respect to the first base 27.

The apparatus body 35 includes a gripping mechanism 23 and a CCD (solid-state image sensing device) 43. The hand device 22 is driven by an arm electric motor 69 and a gripping mechanism electric motor 72 (see FIG. 10), and has a function to grip and hold the magnetic tape cartridge 15 (see FIGS. 4A to 4B). The hand device 22 includes a pair of left and right gripping arms 24 driven by the arm electric motor 69.

The gripping arms 24 are moved by the arm electric motor 69 in the directions indicated by arrows B1, B2 in FIG. 8, and is displaced in the directions indicated by arrows C1, C2 by the gripping mechanism electric motor 72. A claw 24a is formed at a distal end portion of the each gripping arm 24. The claw 24a has a shape engaging the receiving portion 15a (see FIG. 4A and FIG. 4B) formed on the magnetic tape cartridge 15.

In addition, the CCD (solid-state image sensing device) 43 is disposed in the apparatus body 35. The CCD 43 is disposed on a surface of the apparatus body 35 where the gripping arms 24 are provided. In this embodiment, the gripping arms 24 are disposed on a lower portion of the gripping mechanism 23.

The CCD 43 is provided so as to recognize the flags 37 provided on the flag-attached cells 20A-1 to 20A-3. The CCD 43 is connected to the library control board 92 via the control board 61 as illustrated in FIG. 10. The CPU 93 provided on the library control board 92 measures the position of the cells 14 provided in the medium storing shelf 13 with high degree of accuracy from image information of the flag 37 picked up by the CCD 43, and positions the transport robot 18 on the basis of the position information obtained from the result thereof. In other words, the flag 37 is used for obtaining the position information for transporting the magnetic tape cartridges 15.

Here, a control system for controlling the transport robot 18 will be described. FIG. 10 illustrates a control system configured to control the transport robot 18. As illustrated in the same drawing, the transport robot 18 is connected to the library control board 92 via the control board 61. The control board 61 includes a CPU (Central Processing Circuit) 62 mounted thereon. A RAM (Random Access Memory) 63 or a non-volatile memory 64 are connected to the CPU 62.

The non-volatile memory 64 stores a software program 65 (illustrated as software in FIG. 10) and position data 66. The position data 66 includes data which specifies the cell positions for the individual cells 14 (including the flag-attached cells 20A-1 to 20A-3) and data which specifies the positions of the magnetic tape driving devices 16A to 16C. When specifying the respective positions, X-coordinate values, Y-coordinate values, and Z-coordinate values on a X, Y, Z coordinate system and rotational angles of the hand device 22. The CPU 62 is able to execute drive control of the transport robot 18 on the basis of the software program 65 or the position data 66 stored temporarily in the RAM 63, for example.

The Y-axis electric motor 67, the Z-axis electric motor 68, the arm electric motor 69, the rotary electric motor 71, and the gripping mechanism electric motor 72 which are integrated in the transport robot 18, are connected to the CPU 62. The CPU 62 supplies drive signals to the Y-axis electric motor 67, the Z-axis electric motor 68, the arm electric motor 69, the rotary electric motor 71, and the gripping mechanism electric motor 72. The individual electric motors 67 to 72 are rotated at rotational speeds specified on the basis of the drive signals. The amount of movement in the Y-axis direction, the amount of movement in the Z-axis direction, the amount of movement in the X-axis direction, and the amount of rotation about a vertical axis of the hand device 22, and the amount of movement of the gripping mechanism 24 in the fore-and-aft direction are determined by the rotational speeds of the individual electric motors 67 to 72.

The CCD 43 described above is connected to the CPU 62. Black and white determination signals are supplied to the CPU 62 for respective pixels from the CCD 43. An LED which serves as illumination at the time of image pickup of the flag 37 is provided in the vicinity of the CCD 43, although it is not illustrated in FIGS. 7A to 7B. A LED driver 73 causes the LED to emit light. The light-emitting amount of the LED is also controlled by the CPU 62.

The control board 61 is connected to the library control board 92. The library control board 92 includes the CPU 93, a RAM 94, and a non-volatile memory 95, for example. The non-volatile memory 95 stores a software program 96. The CPU 93 executes a control process of the transport robot 18 and a flag reading process or the like described later according to the software program 96 stored temporarily in the RAM 94, for example. The library control board 92 is connected to a host computer, not illustrated.

Subsequently, the operation of the library apparatus 10 will be described. The CPU 93 on the library control board 92 executes a library control on the basis of the software program 96 in the non-volatile memory 95. When an instruction of writing or reading of data from the host computer is supplied to the library control board 92, the library control board 92 specifies a target magnetic tape cartridge 15.

When the magnetic tape cartridge 15 is specified, the cell 14 in the medium storing shelf 13 where the specified magnetic tape cartridge 15 is stored is specified. In this case, the respective cells 14 provided in the medium storing shelf 13 and the magnetic tape cartridges 15 stored in the cells 14 are brought into correspondence in advance. Also, the transport robot 18 is driven-controlled by the CPU 93 on the basis of the position information of the cell 14 as described above. Therefore, the correspondence described above is performed between the positions of the cells 14 and the magnetic tape cartridges 15. The data in which the positions of the cells 14 and the magnetic tape cartridges 15 corresponding thereto (hereinafter, referred to as correspondence data) is stored in the position data 66 of the control board 61.

The cell 14 is notified to the control board 61 from the library control board 92. The CPU 62 on the control board 61 issues an instruction about the operation of the transport robot 18 on the basis of the software program 65 in the non-volatile memory 64. Upon reception of this instruction, the CPU 62 of the control board 61 reads the position of the specified cell 14 on the basis of the correspondence data stored in the position data 66.

The amount of movement in the Y-axis direction, the amount of movement in the Z-axis direction, and the amount of movement in the X-axis direction, and the amount of rotation of the hand device 22 by the transport robot 18 is determined on the basis of the position of the cell 14. The control board 61 controls the transport robot 18 on the basis of the determined amount of movement and amount of rotation. More specifically, the CPU 62 supplies drive signals corresponding to the respective amounts of movement and the amounts of rotation described above for the individual electric motors 67 to 72. Accordingly, the hand device 22 is moved upward and downward in the Y1, Y2 directions by a predetermined amount by the Y-direction transporting mechanism 19, and the hand device 22 is moved in the Z1, Z2 directions by a predetermined amount by the Z-direction transporting mechanism 21, and the apparatus body 35 of the hand device 22 is rotated by a predetermined angle with respect to the second base 34.

By the movement of the hand device 22 as described above, the gripping arms 24 are brought into a state of opposing the magnetic tape cartridge 15 stored in the specified cell 14. Subsequently, when the gripping arms 24 is moved in the B1 direction toward the magnetic tape cartridge 15, and the claws 24a oppose the receiving portion 15a of the magnetic tape cartridge 15, the gripping arms 24 are displaced in the C1 direction. Accordingly, the claws 24a engage the receiving portion 15a, and the magnetic tape cartridge 15 is brought into a state of being held by the hand device 22.

The CPU 62 determines the amount of movement in the Y-axis direction, the amount of movement in the Z-axis direction, the amount of movement in the X-axis direction and the amount of rotation of the hand device 22 for transporting the magnetic tape cartridge 15 held by the hand device 22 to the magnetic tape driving device (the magnetic tape driving device 16A here). Then the control board 61 controls the transport robot 18 on the basis of the determined amount of movement and amount of rotation. Accordingly, the magnetic tape cartridge 15 held by the hand device 22 is transported to the magnetic tape driving device 16A. Then, the magnetic tape cartridge 15 is mounted in the magnetic tape driving device 16A, and the recording and reproducing process is executed for the specified magnetic tape cartridge 15.

Incidentally, in order to mount and demount the magnetic tape cartridge 15 with respect to the cell 14 in the medium storing shelf 13 by the transport robot 18, the positional correspondence between the transport robot 18 and the medium storing shelf 13 is required to be achieved with high degree of accuracy. In the same manner, in order to mount and demount the magnetic tape cartridge 15 with respect to the magnetic tape driving devices 16A to 16C by the transport robot 18, the positional correspondence between the transport robot 18 and the magnetic tape driving devices 16A to 16C is required to be achieved with high degree of accuracy. If there is an error in the relative position between the transport robot 18 and the cell 14, and an error in the relative position between the transport robot 18 and the magnetic tape driving devices 16A to 16C, smooth mounting and demounting of the magnetic tape cartridge 15 with respect to the cell 14 or the magnetic tape driving devices 16A to 16C may not be achieved.

The correspondence between the transport robot 18 and the cells 14 are executed using the CCD 43 provided on the hand device 22 and the flags 37 provided on the above-described flag-attached cells 20A-1 to 20A-3. In the same manner, the correspondence between the transport robot 18 and the magnetic tape driving devices 16A to 16C is executed using the CCD 43 provided on the hand device 22 and the flags 37 disposed under the tape insertion ports of the respective magnetic tape driving devices 16A to 16C.

Figure 11A:
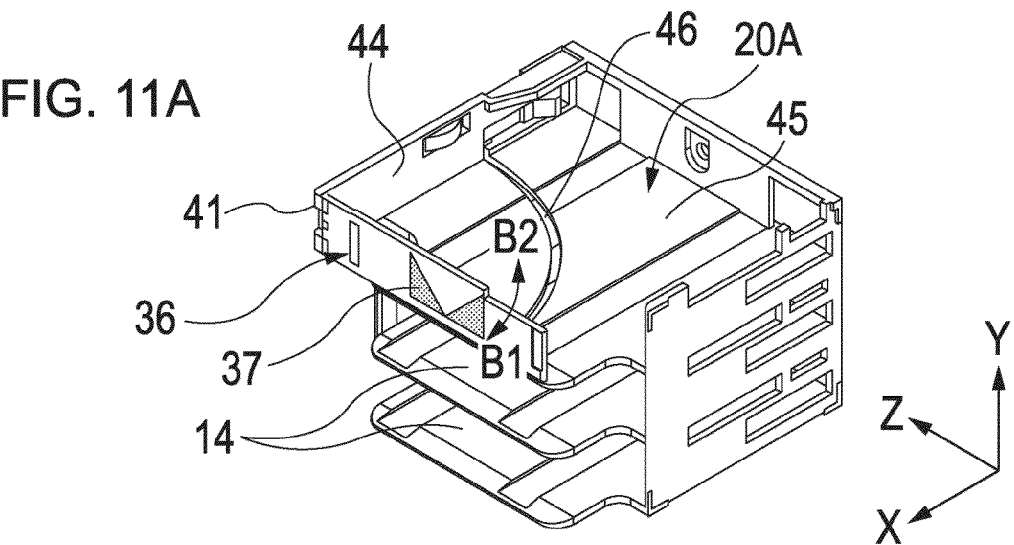
Figure 11B:
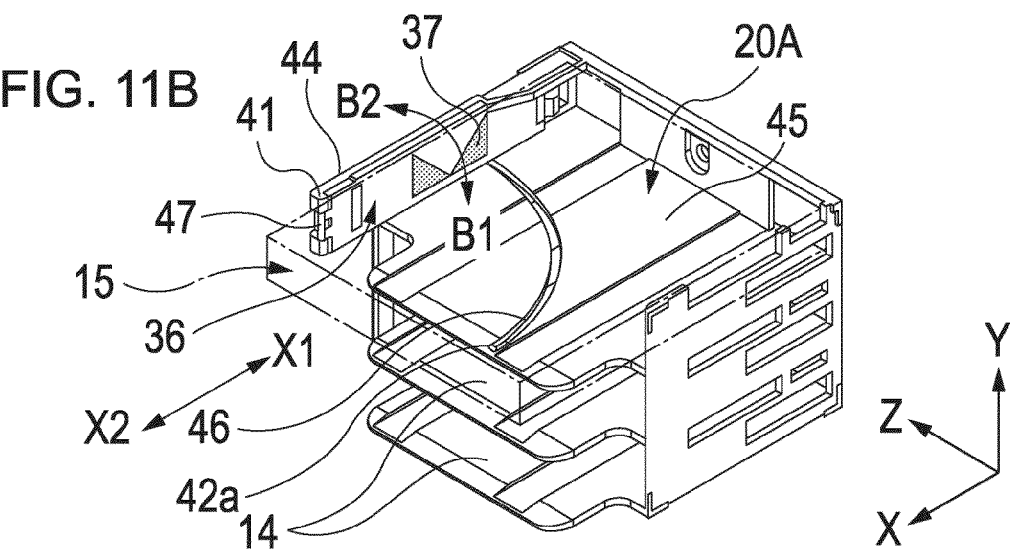
Figure 17:
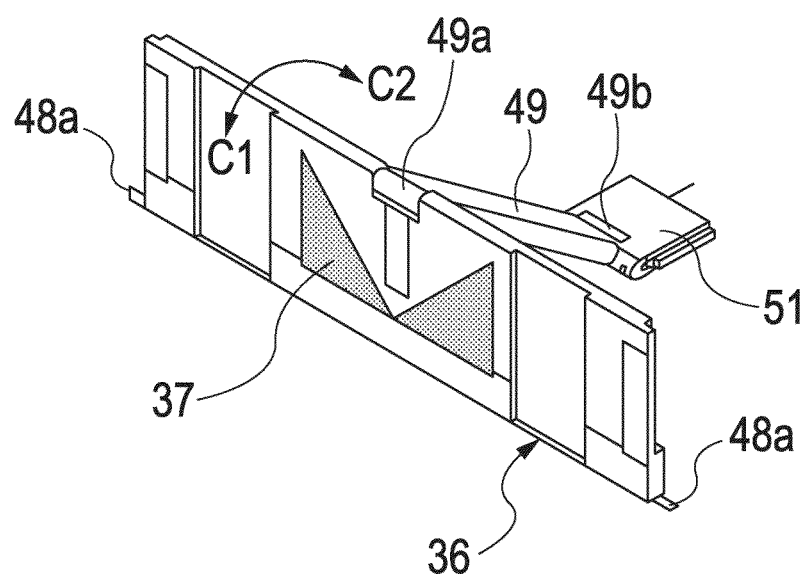
FIG. 17 is a perspective view of a vicinity of a flag panel of the library apparatus according to the second embodiment of the present invention in an enlarged scale.

As indicated in FIGS. 11A to 11B and in FIG. 17, the flag 37 employed here is a mark of a shape having isosceles triangles opposed to each other. The flag 37 (illustrated by a satin finished surface) is colored for example into white, and other portions are colored, for example, into black. By performing contrast enhancement, the image pickup accuracy of the flag 37 by the CCD 43 is enhanced.

Error detection of the relative position between the transport robot 18 using the flags 37 and the CCD 43 and the cell 14, and error detection of the relative position between the transport robot 18 and the magnetic tape driving devices 16A to 16C are performed, for example, in the following manner. Although the error detection of the relative position between the transport robot 18 and the cell 14 for example will be described in the following description, the error detection between the transport robot 18 and the magnetic tape driving devices 16A to 16C may also be performed in the same manner.

The CPU 62 moves the hand device 22 to a position opposing the flag-attached cell 20A-1 by controlling the transport robot 18. The position of the flag-attached cell 20A-1 is stored in the position data 66. Therefore, the CPU 62 reads out the position of the flag-attached cell 20A-1 from the position data 66, and determines the amount of movement in the Y-axis direction, the amount of movement in the Z-axis direction, the amount of movement in the X-axis direction, and the amount of rotation for moving the CCD 43 provided on the hand device 22 to a position opposing the flag 37 provided on the flag-attached cell 20A-1 (hereinafter, referred to as detecting position). Then, the CPU 62 controls the transport robot 18 on the basis of the determined amount of movement and the amount of rotation, and moves the hand device 22 to the detecting position.

When the hand device 22 is moved to the detecting position, the process to pick up the image of the flag 37 is performed by the CCD 43. The horizontal direction of the image picked up by the CCD 43 is expressed as an $X_{CCD}$ coordinate and the direction orthogonal thereto is expressed as a $Y_{CCD}$ coordinate. In contrast, the orthogonal coordinates of the flag 37 appearing in this image are expressed as an $X_F$ coordinate and a $Y_F$ coordinate. If there is no relative error between the hand device 22 and the flag-attached cell 20A-1, the $X_{CCD}$ coordinate and the $Y_{CCD}$ coordinate match the $X_F$ coordinate and the $Y_F$ coordinate. However, if the $X_{CCD}$ coordinate and the $Y_{CCD}$ coordinate do not match the $X_F$ coordinate and the $Y_F$ coordinate, it means that there exists a relative error between the hand device 22 and the flag-attached cell 20A-1.

If the relative error exists, the control board 61, when moving the hand device 22 to the respective cells 14 (including the flag-attached cells 20A-1 to 20A-3) and the magnetic tape driving devices 16A to 16C, corrects the error and sets the amount of movement in the Y-axis direction, the amount of movement in the Z-axis direction, the amount of movement in the X-axis direction, and the amount of rotation of the hand device 22. By performing this correcting process, the process of mounting and demounting the magnetic tape cartridges 15 to the cells 14 by the transport robot 18, and the process of mounting and demounting with respect to the magnetic tape driving devices 16A to 16C by the transport robot 18 can be performed accurately.

The process of detecting the relative error using the flag 37 and the correcting process on the basis of the relative error are executed when the library apparatus 10 is initially activated (hereinafter, referred to as "at the time of initial activation"), and when occurrence of the relative error with time is expected (hereinafter, referred to as "at the time of retry"). In this embodiment, in order to enhance the accuracy of detection of the relative error, the flag-attached cells 20A-1 to 20A-3 are disposed at three points apart from each other as described above, and performing the error detection for the respective flag-attached cells 20A-1 to 20A-3, so that accuracy of the detection of the error is enhanced.

Subsequently, detailed configurations of the flag-attached cells 20A-1 to 20A-3 will be described in detail. Since the configurations of the flag-attached cells 20A-1 to 20A-3 are all the same, one of them is described as a flag-attached cell 20A in the following description.

Figure 11C:
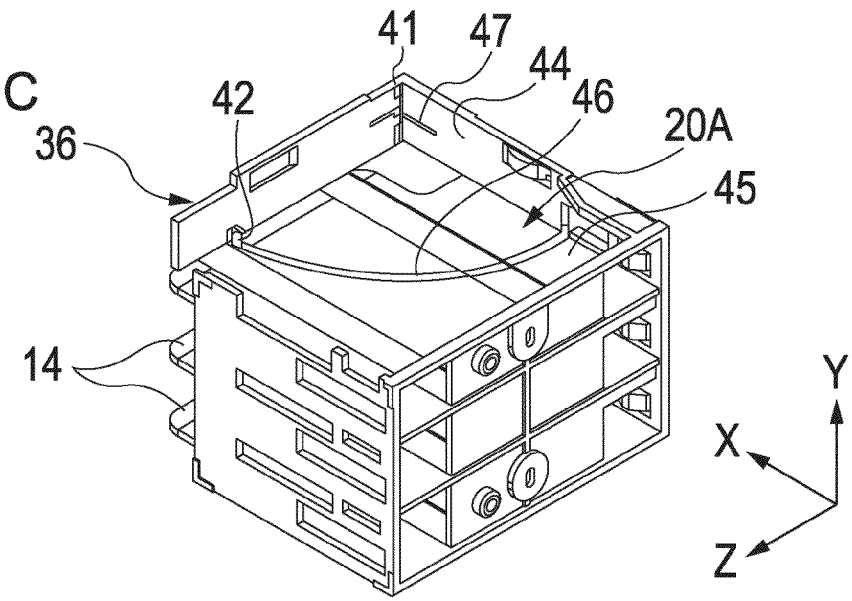

FIGS. 11A to 11C are drawings for explaining the flag-attached cell 20A according to the first embodiment. In the respective drawings, an example in which the flag-attached cell 20A is provided above the two cells 14 stacked in the Y-direction is illustrated.

The contour of the flag-attached cell 20A is the same as that of the cell 14. In other words, the flag-attached cell 20A has a shape which allows the magnetic tape cartridge 15 to be mounted therein. The flag-attached cell 20A has a flag moving mechanism. The flag moving mechanism includes a flag panel 36, a guide pin 42, a guiding groove 46, and a spring 47 (corresponding to the first urging member described in claims).

The flag panel 36 is a rectangular panel member, and is formed of resin in this embodiment. However, it may be formed of other materials such as metal. The flag panel 36 is disposed at an opening portion (a portion where the magnetic tape cartridge 15 is inserted) of the flag-attached cell 20A.

The flag panel 36 is formed with the flag 37 on the front side. The flag 37 is formed by, for example, two-color molding methods. Then, as described above, the flag 37 is formed of white resin, and other portion of the flag panel 36 is formed of black resin.

One end portion on one side of the flag panel 36 (left end portion in FIG. 11A) is attached to a side panel portion 44 which constitutes the flag-attached cell 20A by a hinge 41. Therefore, the flag panel 36 is rotatable about the hinge 41 in the direction indicated by arrows B1, B2 in FIG. 11A.

FIG. 11A illustrates the flag-attached cell 20A in a state in which the flag panel 36 is rotated in the B1 direction, and the flag 37 is displayed. Hereinafter, the position where the flag 37 of the flag panel 36 is displayed is referred to as a flag displayed position. FIG. 11B illustrates a state in which the flag panel 36 is rotated in the B2 direction, and is substantially parallel to the side panel portion 44. Hereinafter, the position where the flag panel 36 is overlapped with the side panel portion 44 in substantially parallel thereto is referred to as a retracted position.

In contrast, the guide pin 42 is formed on a back surface of the flag panel 36 (an opposite surface from the surface where the flag 37 is formed) (see FIG. 11C). Although an example in which the guide pin 42 is formed integrally with the flag panel 36 is illustrated in this embodiment, it is also possible to use a metal pin as the guide pin 42 and fix the same to the flag panel 36.

When the flag panel 36 rotates about the hinge 41, the guide pin 42 forms an arcuate movement track. A bottom panel portion 45 of the flag-attached cell 20A is provided with the guiding groove 46 of a shape corresponding to the movement track of the guide pin 42. The guiding groove 46 functions as a guiding mechanism for guiding the movement of the flag panel 36 when the flag panel 36 is moved between the flag displayed position and the retracted position.

In this embodiment, the guiding groove 46 is provided by forming a hole on the bottom panel portion 45. However, it is also possible to form a guide rail corresponding to the movement track of the guide pin 42 instead of the guiding groove 46. In this manner, by providing the guide pin 42 on the flag panel 36 and forming the guiding groove 46 for guiding the guide pin 42 on the flag-attached cell 20A (the bottom panel portion 45), the flag panel 36 can be moved between the flag displayed position and the retracted position stably without rattling. In this case, the dimensional accuracy between the guiding groove 46 and the guide pin 42 is set to be ±0.2 mm or smaller.

The spring 47 is attached to the hinge 41. The spring 47 is a torsion spring, and urges the flag panel 36 in the direction indicated by the arrow B1. Therefore, in a state in which the magnetic tape cartridge 15 is not mounted, the flag panel 36 is urged by the spring 47, and is located at the flag displayed position. In this case, the guide pin 42 provided on the flag panel 36 is in abutment with an end portion 42a (an end on the side of the flag displayed position) of the guiding groove 46 by being pressed thereto by a resilient force of the spring 47. The spring 47 and the hinge 41 function as a rotating mechanism which causes the flag panel 36 to rotate between the flag displayed position and the retracted position.

As described above, the dimensional accuracy between the guiding groove 46 and the guide pin 42 is set with a degree of accuracy as high as ±0.2 mm or smaller. Also, the guide pin 42 is brought into press contact with the end portion 42a of the guiding groove 46 by the spring 47. In addition, the hinge 41 is configured to be able to rotate the flag panel 36 with the same degree of accuracy as the accuracy between the guiding groove 46 and the guide pin 42.

Therefore, the flag panel 36 is positioned at the flag displayed position with high degree of accuracy. As described above, the flag panel 36 is formed with the flag 37, and the flag 37 is used to detect and correct the relative error between the cell 14 and the transport robot 18. Therefore, when the positional accuracy of the flag 37, that is, the positional accuracy of the flag panel 36 is low, the positional accuracy between the cell 14 and the transport robot 18 cannot be enhanced.

However, as described above, the flag panel 36 can be positioned at the flag displayed position with high degree of accuracy according to this embodiment. Therefore, the relative error between the cell 14 and the transport robot 18 can be detected with high degree of accuracy, so that the transport accuracy of the magnetic tape cartridge 15 by the transport robot 18 can be enhanced.

The flag panel 36 configured as described above is moved to the retracted position by the magnetic tape cartridge 15 being inserted into the flag-attached cell 20A. More specifically, when the magnetic tape cartridge 15 is transported to the flag-attached cell 20A by the transport robot 18, and is inserted into the flag-attached cell 20A in the direction indicated by an arrow X1 in FIG. 11B, a distal end portion of the magnetic tape cartridge 15 firstly comes into abutment with the flag panel 36 and presses the same.

The urging force that the spring 47 urges the flag panel 36 in the B1 direction is set to be smaller than an insertion force that the hand device 22 of the transport robot 18 inserts the magnetic tape cartridge 15 into the flag-attached cell 20A. Therefore, in association with the insertion of the magnetic tape cartridge 15 into the flag-attached cell 20A, the flag panel 36 is moved to the retracted position which does not hinder the mounting of the magnetic tape cartridge 15.

Figure 13A:
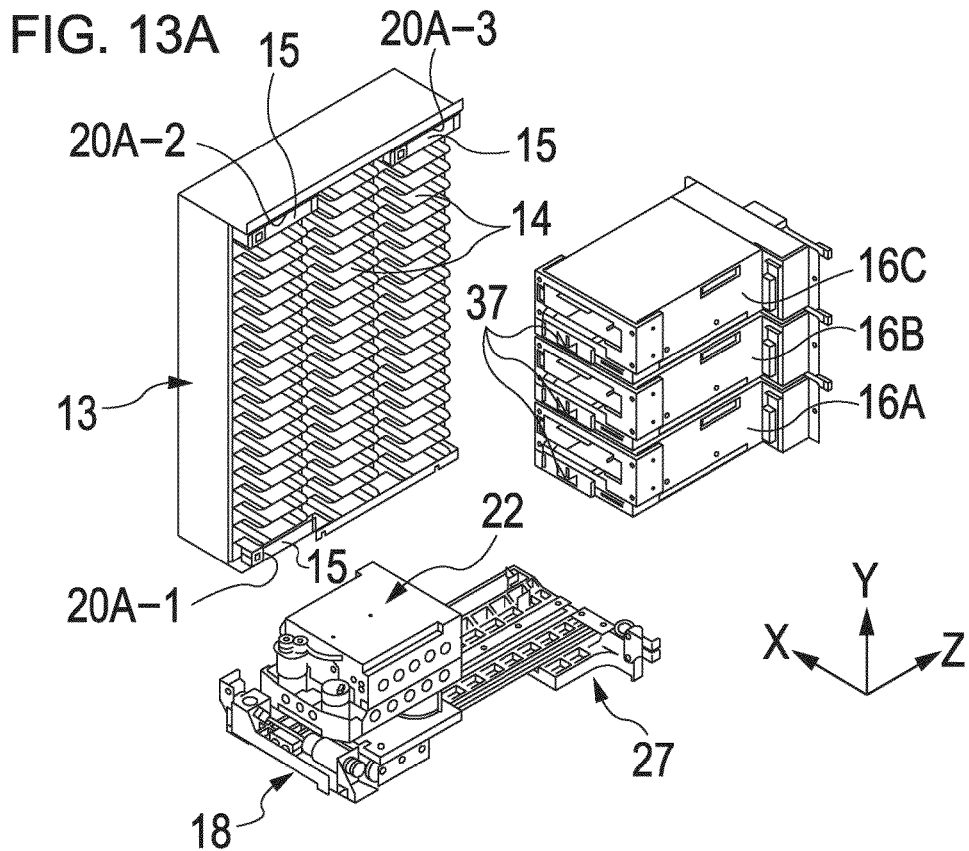
FIG. 13A and FIG. 13B are perspective views illustrating a process of transporting the magnetic tape cartridge from a flag-attached cell to a magnetic tape driving device according to the procedure of the process (No. 1).

FIG. 11B illustrates a state in which the magnetic tape cartridge 15 (illustrated by an alternate long and short dash line in the drawing) is mounted in the flag-attached cell 20A (referred to as the mounted state). In this mounted state, the flag panel 36 is located at the retracted position which does not hinder the mounting of the magnetic tape cartridge 15. Also, even when the flag panel 36 is positioned at the retracted position, the magnetic tape cartridge 15 is reliably mounted in the flag-attached cell 20A. FIG. 9B illustrates the medium storing shelf 13 in which the flag panel 36 of the flag-attached cells 20A-1 to 20A-3 is moved to the retracted position (the magnetic tape cartridge 15 is not illustrated), and FIG. 13A illustrates the medium storing shelf 13 in which the magnetic tape cartridges 15 are mounted in the respective flag-attached cells 20A-1 to 20A-3. In this manner, the magnetic tape cartridge 15 can be mounted in the flag-attached cell 20A according to this embodiment.

In contrast, when the magnetic tape cartridge 15 is taken out from the flag-attached cell 20A by the transport robot 18, the flag panel 36 is rotated in the B1 direction by the urging force of the spring 47 in association with the movement in the X2 direction of the magnetic tape cartridge 15. Then, in the state in which the magnetic tape cartridge 15 is removed from the flag-attached cell 20A completely, the flag panel 36 is positioned again at the flag displayed position so that the flag panel 36 can be recognized from the outside of the medium storing shelf 13.

Incidentally, as described above, the increase in number of storage of the magnetic tape cartridge 15 and downsizing are desired for the library apparatus 10. The library apparatus 10 according to this embodiment is configured to be able to mount the magnetic tape cartridge 15 because the flag-attached cells 20A-1 to 20A-3 provided on the medium storing shelf 13 are moved to the retracted positions which do not hinder the mounting when the magnetic tape cartridge 15 is mounted. Also, in the state where the magnetic tape cartridge 15 is not mounted, the flag panel 36 is positioned at the flag displayed position, the flag 37 can be recognized from the outside of the medium storing shelf 13.

Figure 1B:
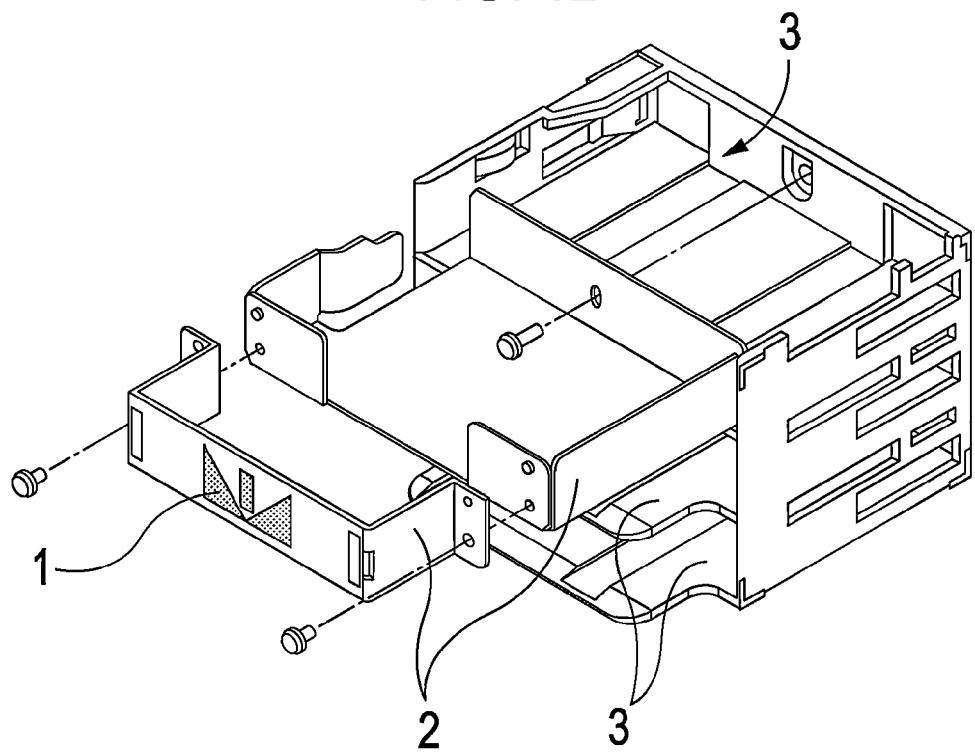

Therefore, in comparison with the configuration in which the flag 1 is fixed to the cell 3 and hence the magnetic tape cartridge 15 cannot be stored (see FIG. 1A and FIG. 1B) as in the related art, the library apparatus 10 in this embodiment achieves enhancement of the storage efficiency of the magnetic tape cartridge 15 with respect to the medium storing shelf 13. More specifically, in a case where three flags 37 are provided on the medium storing shelf 13 having N pieces of the cells 14, only the N−3 pieces of the magnetic tape cartridges can be stored in the related art, but the N pieces of the magnetic tape cartridges 15 can be stored in this embodiment. Also, when an attempt is made to store the N pieces of magnetic tape cartridges, downsizing of the medium storing shelf 13 is achieved in comparison with the related art, and hence downsizing of the library apparatus 10 is achieved.

Subsequently, a flag reading process in the library apparatus 10 having the above-described flag-attached cells 20A-1 to 20A-3 will be described. Here, the flag reading process is a process to move the hand device 22 provided with the CCD 43 to a position opposing the flag 37 as described above by the transport robot 18 and pick up (read) an image of the flag 37 by the CCD 43.

Figure 12:
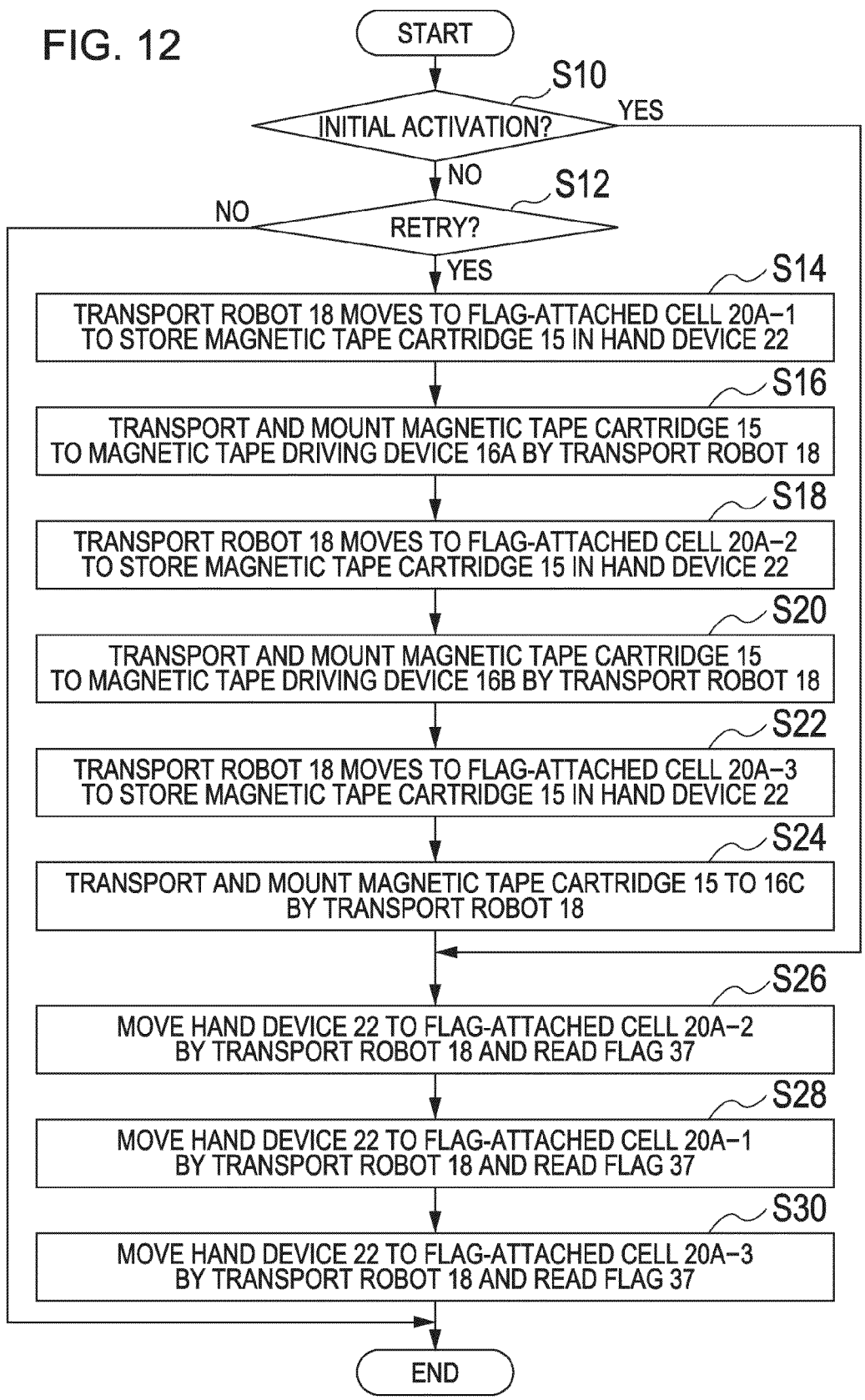
FIG. 12 is a flowchart for explaining a flag reading process in the library apparatus according to the first embodiment of the present invention.

FIG. 12 is a flowchart illustrating a process of reading the flag, and FIG. 13A to FIG. 15D show operation of the library apparatus 10 at the time of executing the flag reading process in detail. The flag reading process described below is stored in the non-volatile memory 95 of the library control board 92 as a software program, and the CPU 93 of the library control board 92 executes the same. When the control board 61 controls the transport robot 18 on the basis of the instruction from the library control board 92, the flag reading process is executed.

FIG. 13A illustrates the library apparatus 10 before the flag reading process is started. The medium storing shelf 13 illustrated in FIG. 13A illustrates a state in which the magnetic tape cartridges 15 are mounted only in the flag-attached cells 20A-1 to 20A-3 for the sake of convenience of illustration. However, it is assumed that the magnetic tape cartridges 15 are stored in all of the cell 14 except for the flag-attached cells 20A-1 to 20A-3. FIG. 13B, FIGS. 14A to 14B, and FIGS. 15A to 15D used for the description given below are the same.

When the flag reading process illustrated in FIG. 12 is activated, whether the flag reading process of this time is the reading process at the time of the initial activation or not is determined in Step 10 (in the drawing, Step is abbreviated as "S"). When it is determined not to be the initial activation, the procedure goes to Step 12, where whether retry (rereading) is to be performed is determined. When negative determination is given in Step 12, since it is not necessary to perform the reading process from the step 14 onward, the process is ended.

Figure 13B:
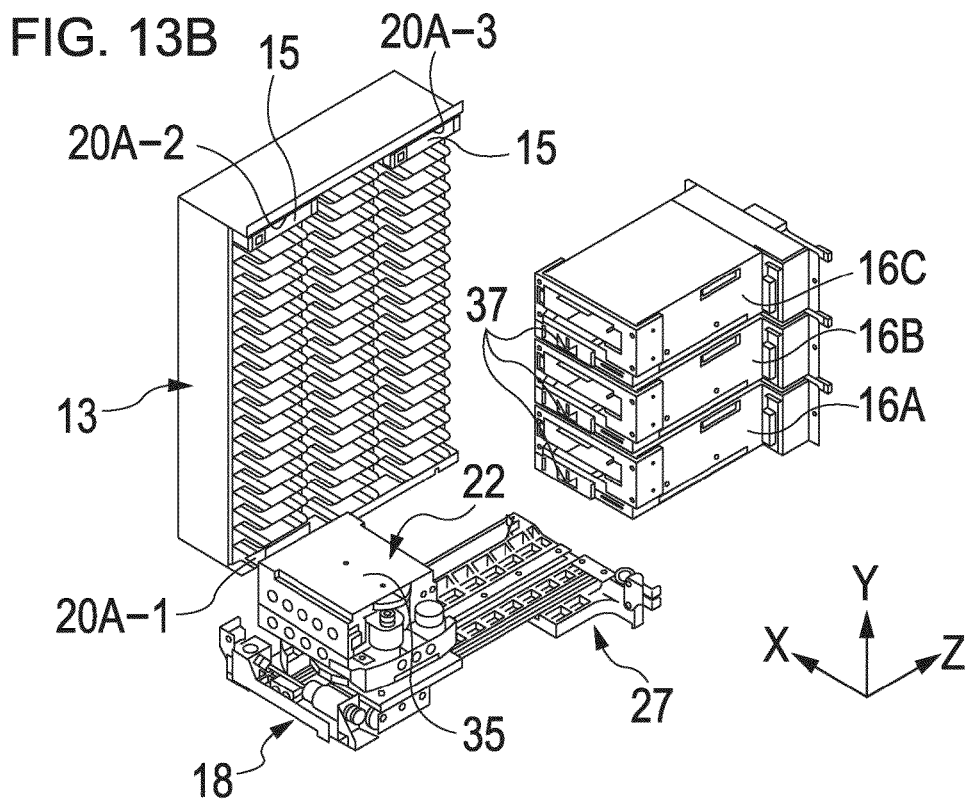

In contrast, when it is determined to perform the retry in Step 12, firstly in Step 14, the control board 61 controls the transport robot 18 to move the hand device 22 to the position opposing the flag-attached cell 20A-1. Subsequently, the hand device 22 extends the gripping arms 24 to engage the claws 24a with the receiving portions 15a of the magnetic tape cartridge 15, and then retracts the gripping arms 24 to store the magnetic tape cartridge 15 from the flag-attached cell 20A-1 into the apparatus body 35. FIG. 13B illustrates a state in which the magnetic tape cartridge 15 is stored in the hand device 22 (the apparatus body 35) from the flag-attached cell 20A-1.

As described above, when the magnetic tape cartridge 15 is taken out from the flag-attached cell 20A-1, the flag panel 36 is moved to the flag displayed position by the urging force of the spring 47. Accordingly, by the magnetic tape cartridge 15 stored in the hand device 22 (the apparatus body 35), the flag 37 is brought into a state of being recognized from the outside of the medium storing shelf 13 in the flag-attached cell 20A-1.

Figure 14A:
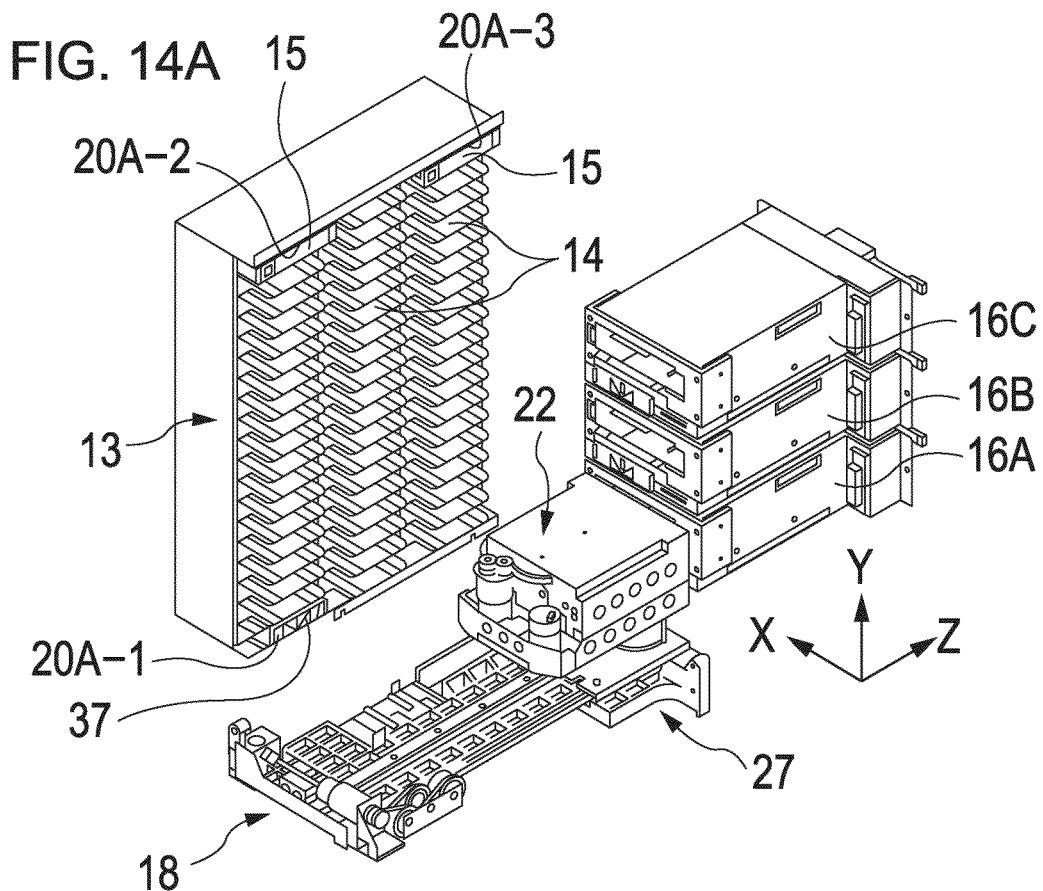
FIG. 14A and FIG. 14B are perspective views illustrating a process of transporting the magnetic tape cartridge from the flag-attached cell to the magnetic tape driving device according to the procedure of the process (No. 2).

In the subsequent Step 16, the control board 61 controls the transport robot 18 to move the hand device 22 to a position opposing the magnetic tape driving device 16A. Then, the gripping arms 24 are extended to mount the magnetic tape cartridge 15, and the magnetic tape cartridge 15 stored in the apparatus body 35 is mounted on the magnetic tape driving device 16A. FIG. 14A illustrates a state in which the hand device 22 stores the magnetic tape cartridge 15 into the magnetic tape driving device 16A.

Mounting of the magnetic tape cartridge 15 with respect to the magnetic tape driving device 16A here is not for performing the recording and reproducing process, but is a temporary storage of the magnetic tape cartridge 15.

In other words, in order to perform the flag reading process, the flag panel 36 is needed to be displayed and, in order to do so, if the magnetic tape cartridges 15 are mounted on the flag-attached cells 20A-1 to 20A-3, the magnetic tape cartridges 15 are needed to be taken out from the flag-attached cells 20A-1 to 20A-3. However, in this embodiment, as described above, the magnetic tape cartridges 15 are stored in all the cells 14 except for the flag-attached cells 20A-1 to 20A-3. Therefore, while the flag reading process is being executed, it is necessary to store the magnetic tape cartridges 15 taken out from the flag-attached cells 20A-1 to 20A-3 to positions other than the medium storing shelf 13 (hereinafter, this storage is referred to as temporary storage).

Therefore, in this embodiment, the magnetic tape driving devices 16A to 16C are used as a place for the temporary storage for the magnetic tape cartridges 15 during the flag reading process. Therefore, the number of the flag-attached cells 20A-1 to 20A-3 to be installed are set to be the same or smaller than the number of the magnetic tape driving devices 16A to 16C. In this embodiment, an example in which three each of the flag-attached cells 20A-1 to 20A-3 and the magnetic tape driving devices 16A to 16C are provided is illustrated. However, the numbers of the magnetic tape driving devices 16A to 16C and the flag-attached cells 20A-1 to 20A-3 to be installed are not limited thereto as long as the above-described conditions are satisfied.

In this manner, by using the magnetic tape driving devices 16A to 16C as the place for the temporary storage of the magnetic tape cartridges 15, it is not necessary to provide a place for the temporary storage separately in the casing 12, so that downsizing of the library apparatus 10 is achieved. Also, when performing the flag reading process, the magnetic tape driving devices 16A to 16C are not used. Therefore, even when the magnetic tape driving devices 16A to 16C are used as the place for the temporary storage, it does not affect the flag reading process.

When the process of mounting the magnetic tape cartridge 15 to the magnetic tape driving device 16A is ended, the control board 61 controls the transport robot 18 to move the hand device 22 to a position opposing the flag-attached cell 20A-2 in the subsequent step 18. Subsequently, the hand device 22 extends the gripping arms 24 to engage the claws 24a with the receiving portions 15a of the magnetic tape cartridge 15, and then retracts the gripping arms 24 to store the magnetic tape cartridge 15 from the flag-attached cell 20A-2 into the apparatus body 35. Accordingly, the flag panel 36 is moved to the flag displayed position by the urging force of the spring 47, and hence the flag 37 is brought into a state of being recognizable from the outside of the medium storing shelf 13 in the flag-attached cell 20A-2.

In the subsequent Step 20, the control board 61 controls the transport robot 18 to move the hand device 22 to a position opposing the magnetic tape driving device 16B. Then, the gripping arms 24 are extended to mount the magnetic tape cartridge 15 stored in the apparatus body 35 is mounted on the magnetic tape driving device 16B.

In the same manner, in Step 22, the control board 61 controls the transport robot 18 to move the hand device 22 to the position opposing the flag-attached cell 20A-3, and stores the magnetic tape cartridge 15 from the flag-attached cell 20A-3 to the apparatus body 35. Accordingly, the flag panel 36 is moved to the flag displayed position by the urging force of the spring 47, and hence the flag 37 is brought into a state of being recognizable from the outside of the medium storing shelf 13 in the flag-attached cell 20A-3.

Figure 14B:
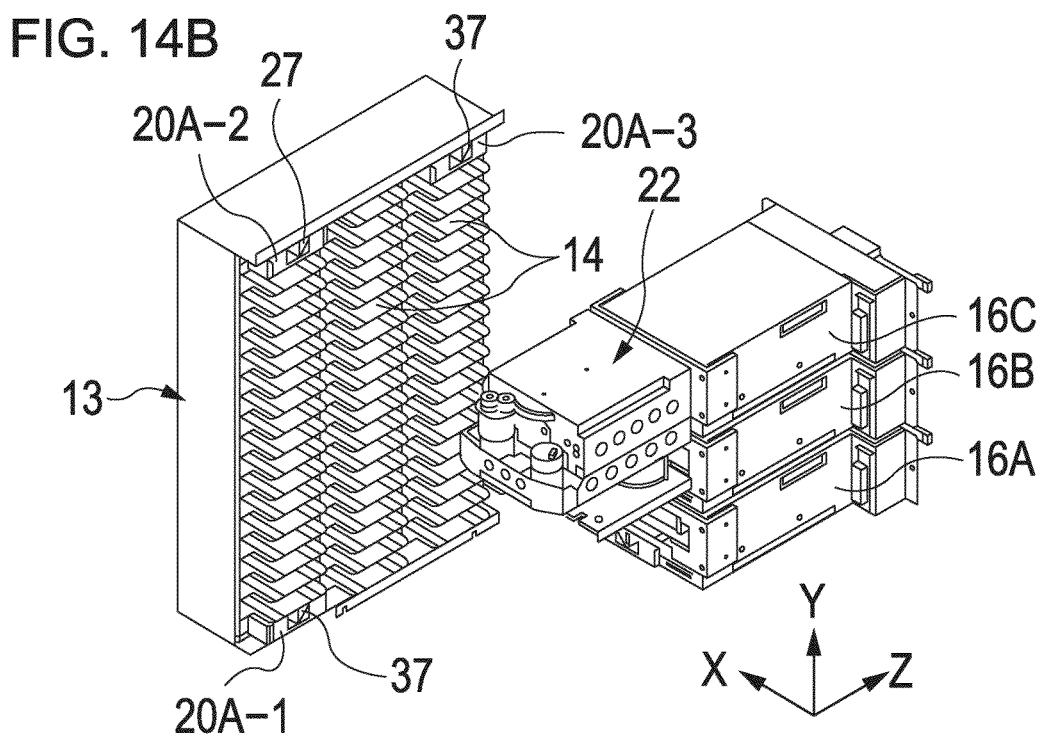

In the subsequent Step 24, the control board 61 controls the transport robot 18 to move the hand device 22 to a position opposing the magnetic tape driving device 16C. Then, the gripping arms 24 are extended to mount the magnetic tape cartridge 15 stored in the apparatus body 35 is mounted on the magnetic tape driving device 16C. FIG. 14B illustrates a state in which the hand device 22 temporarily stores the magnetic tape cartridge 15 into the magnetic tape driving device 16C.

Figure 15A:
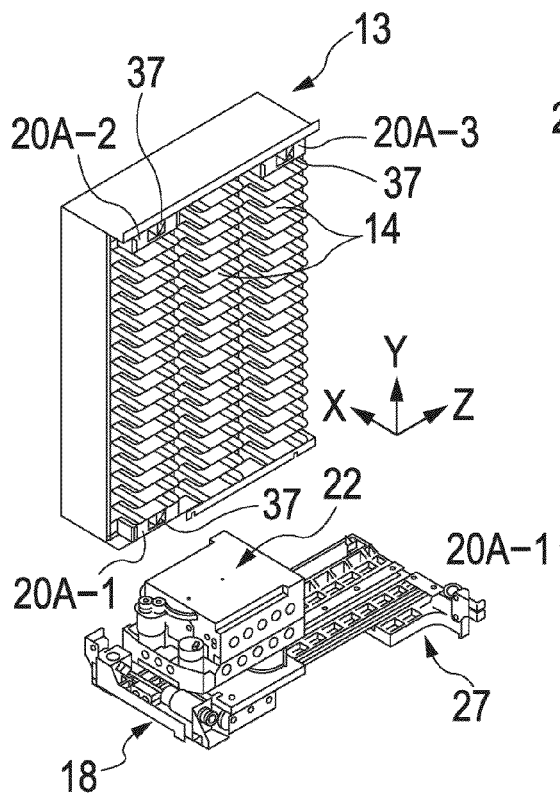
FIGS. 15A to 15D are perspective views illustrating a process of reading the flag according to the procedure of the process.

By executing the process in Steps 14 to 24, the magnetic tape cartridges 15 stored in the flag-attached cells 20A-1 to 20A-3 are temporarily stored in the magnetic tape driving devices 16A to 16C. Also, the flag-attached cells 20A-1 to 20A-3 are brought into a state in which the flag panels 36 can be recognized from the outside respectively with the magnetic tape cartridges 15 taken out. FIG. 15A illustrates a state in which the flag panels 36 are brought into the state of recognizable from the outside at all of these flag-attached cells 20A-1 to 20A-3.

Figure 15B:
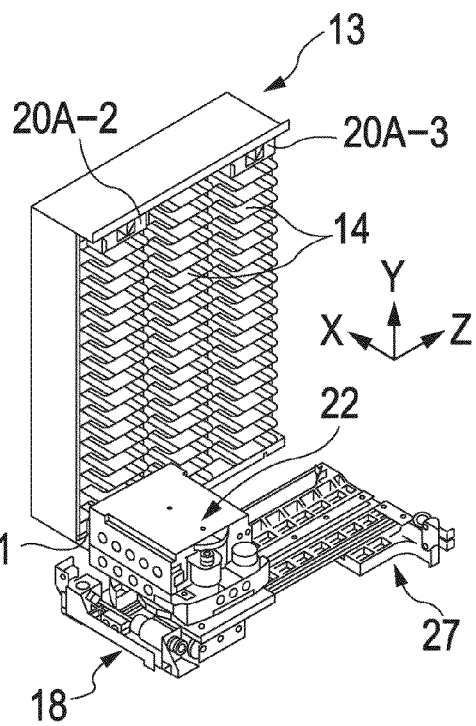

In subsequent Steps 26 to 30, the process of reading the recognizable flag panels 36 by the CCD 43 provided on the hand device 22 is performed. In Step 26, the control board 61 controls the transport robot 18 to move the hand device 22 to a position where the CCD 43 opposes the flag 37 of the flag-attached cell 20A-1. Subsequently, the control board 61 drives the CCD 43 via the LED driver 73, and performs the process of reading the flag 37 of the flag-attached cell 20A-1. FIG. 15B illustrates a state in which the process of reading the flag 37 of the flag-attached cell 20A-1 by the CCD 43 is performed.

Figure 15C:
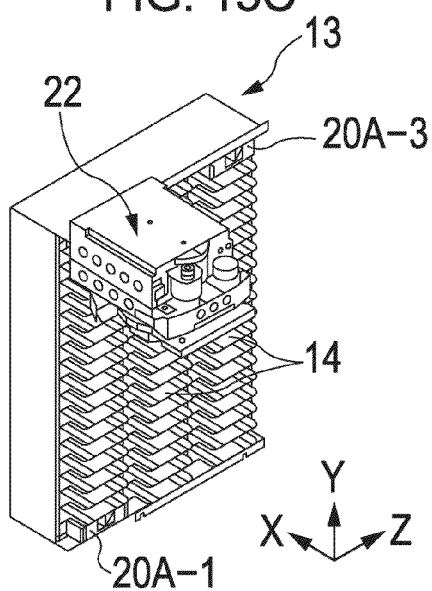

Subsequently, in Step 28, the control board 61 controls the transport robot 18 to move the hand device 22 to the position where the CCD 43 opposes the flag 37 of the flag-attached cell 20A-2, and then the control board 61 drives the CCD 43 via the LED driver 73 to perform the process of reading the flag 37 of the flag-attached cell 20A-2. FIG. 15C illustrates a state in which the process of reading the flag 37 of the flag-attached cell 20A-2 by the CCD 43 is performed.

Figure 15D:
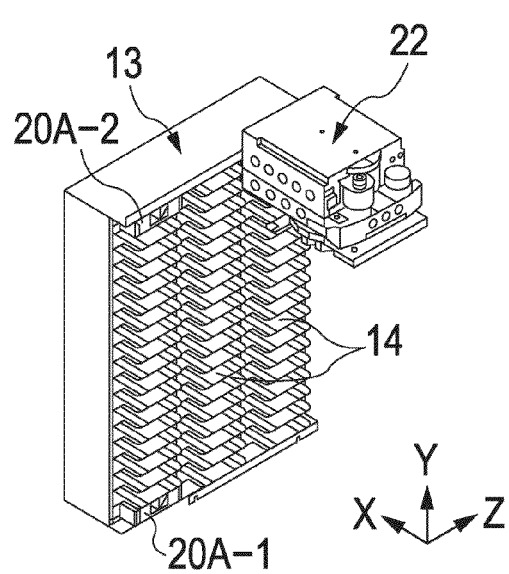

Subsequently, in Step 30, the control board 61 controls the transport robot 18 to move the hand device 22 to the position where the CCD 43 opposes the flag 37 of the flag-attached cell 20A-3, and then the control board 61 drives the CCD 43 via the LED driver 73 to perform the process of reading the flag 37 of the flag-attached cell 20A-3. FIG. 15D illustrates a state in which the process of reading the flag 37 of the flag-attached cell 20A-3 by the CCD 43 is performed.

When it is determined to be at the time of the initial activation in Step 10, the flag reading process at the time of the initial activation is preformed in which the magnetic tape cartridge 15 is not stored in the medium storing shelf 13, and hence the processes of Steps 14 to 24 are skipped and processes from the step 26 onward are executed.

When the process of reading the flags 37 of the flag-attached cells 20A-1 to 20A-3 is ended by executing the process in Steps 14 to 30 described above, the error detection of the relative position between the transport robot 18 and the cell 14 is performed as described above on the basis of the position information obtained from the CCD 43, and the correcting process for correcting this error is executed.

In the embodiment describe above, the example in which the flag reading process is performed under the condition that the magnetic tape cartridges 15 are mounted on all the cells 14 other than the flag-attached cells 20A-1 to 20A-3 in the medium storing shelf 13 has been described. However, when there are free cells in which the magnetic tape cartridges 15 are not stored among the cells 14 provided in the medium storing shelf 13, the magnetic tape cartridges 15 stored in the flag-attached cells 20A-1 to 20A-3 may be stored in the free cells. In this case, since the distance of transport of the magnetic tape cartridge 15 can be shortened, and hence reduction of time required for the temporary storage is achieved.

Subsequently, a flag-attached cell 20B according to a second embodiment will be described.

Figure 16A:
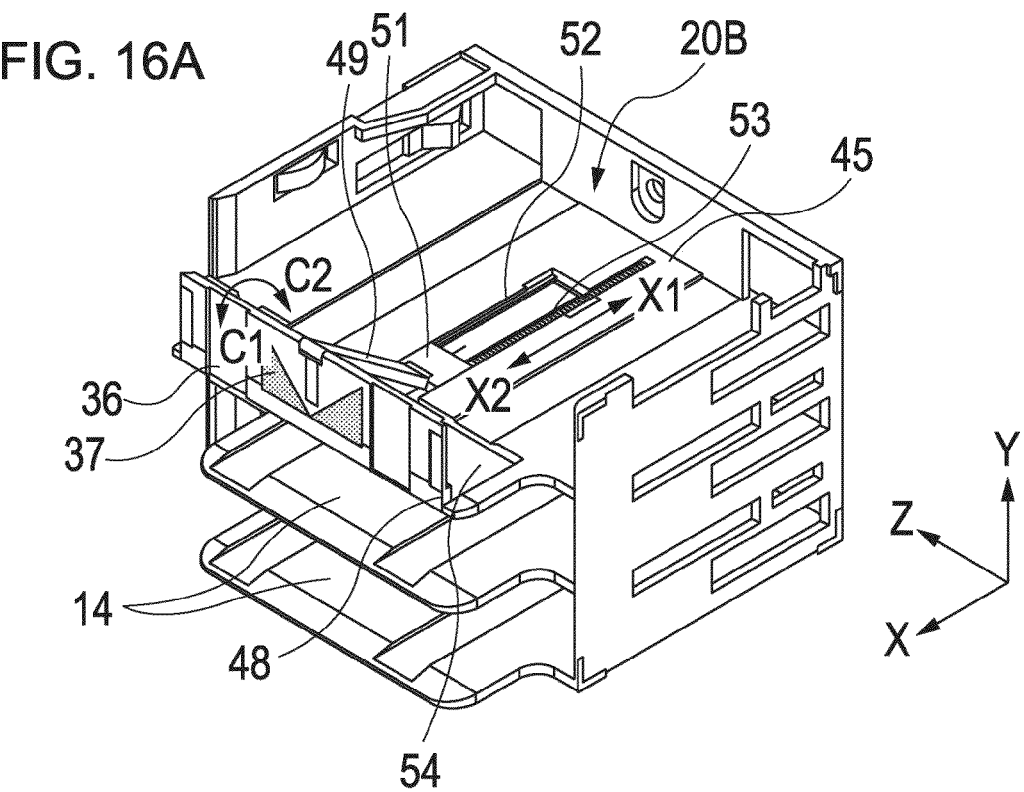
FIGS. 16A to 16B are a drawing for explaining the flag-attached cell provided in the library apparatus according to a second embodiment of the present invention in which FIG. 16 A is a perspective view of a state in which the flag is displayed, which is viewed from the front.
Figure 16B:
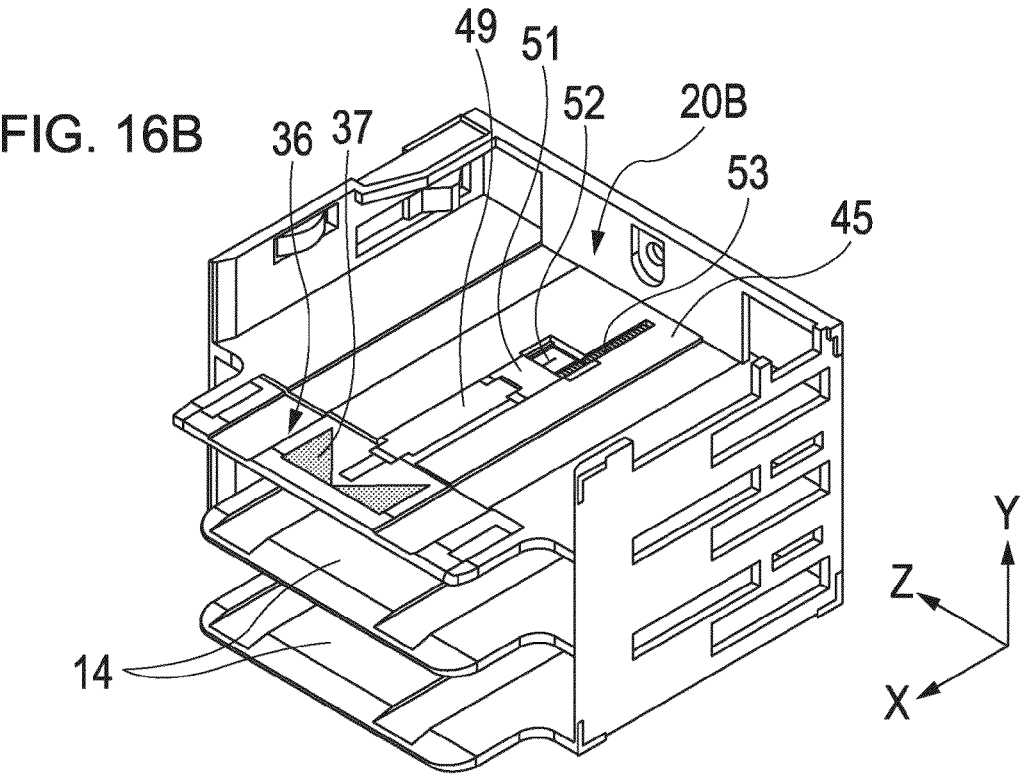

FIGS. 16A to 16B and FIG. 17 are drawings for explaining the flag-attached cell 20B according to the second embodiment. In FIGS. 16A to 16B and FIG. 17, the components corresponding to the components illustrated in FIGS. 2 to 15D are designated by the same reference numerals, and the description is omitted as needed. The same thing is applied to FIGS. 18A to 26 used for the description of the respective third and fourth embodiments.

The flag-attached cell 20A according to the first embodiment includes the hinge 41 provided between the side panel portion 44 and the one end portion of the flag panel 36 on the side of the short side, and the flag panel 36 is configured to rotate in the B1, B2 directions with respect to the side panel portion 44. In contrast, in the case of the flag-attached cell 20B according to this embodiment, a hinge 48 is provided between the bottom panel portion 45 of the flag-attached cell 20B and one end portion of the flag panel 36 on the side of the long side, and hence the flag panel 36 is configured to rotate with respect to the bottom panel portion 45 in the directions indicated by arrows C1, C2 in FIG. 16A. In other words, the flag panel 36 is rotatable toward the bottom panel portion 45 side from the flag displayed position.

The contour of the flag-attached cell 20B is the same shape as the cell 14 in this embodiment as well, and hence has a shape which allows the magnetic tape cartridge 15 to be mounted therein. The flag-attached cell 20B has a flag moving mechanism.

The flag moving mechanism includes the flag panel 36, a link arm 49, a slider 51, a sliding groove 52, and a spring 53 (corresponding to the first urging member described in claims). The flag panel 36 is a square resin-made panel member as illustrated in FIG. 17 in an enlarged scale. The flag panel 36 is disposed at an opening portion (a portion where the magnetic tape cartridge 15 is inserted) of the flag-attached cell 20B. The flag panel 36 is formed with the flag 37 on the front side.

The long side of the flag panel 36 on the lower side is attached to the bottom panel portion 45 of the flag-attached cell 20B by the hinge 48 (in FIG. 17, only a shaft portion 48a which constitutes the hinge 48 is illustrated). Therefore, as described above, the flag panel 36 is rotatable about the hinge 48 in the direction indicated by the arrows C1, C2 in FIGS. 16A to 16B and FIG. 17.

FIG. 16A and FIG. 17 show the flag-attached cell 20B in a state in which the flag panel 36 is rotated in the C1 direction, and the flag 37 is displayed. Hereinafter, the position where the flag 37 of the flag panel 36 is displayed is referred to as a flag displayed position. FIG. 16B illustrates a state in which the flag panel 36 is rotated in the C2 direction, and is substantially parallel to the bottom panel portion 45.

The bottom panel portion 45 is formed with a storage recess 54, and the flag panel 36 is stored in the storage recess 54 in a state of being rotated in the C2 direction. In this stored state, the bottom panel portion 45 and the front surface (the surface where the flag 37 is formed) of the flag panel 36 are flush with each other. Hereinafter, the position where the flag panel 36 is overlapped with the bottom panel portion 45 in substantially parallel thereto is referred to as a retracted position.

In contrast, an end portion 49a of the link arm 49 is connected to a center position of an upper long side of the flag panel 36. The end portion 49a is rotatable with respect to the flag panel 36. The other end portion 49b of the link arm 49 is rotatably connected to the slider 51.

The slider 51 engages the sliding groove 52 formed on the bottom panel portion 45 so as to be slidable in the X1, X2 directions. When the slider 51 is guided by the sliding groove 52 and is moved in the X2 direction, the link arm 49 urges the flag panel 36 to rotate in the C1 direction by being pressed by the slider 51, and moves the flag panel 36 at the retracted position toward the flag displayed position.

When the slider 51 is guided by the sliding groove 52 and is moved in the X1 direction, the link arm 49 urges the flag panel 36 to rotate in the C2 direction by being pulled by the slider 51, and moves the flag panel 36 at the flag displayed position toward the retracted position. The link arm 49, the slider 51, and the sliding groove 52 also function as a guiding mechanism for guiding the movement of the flag panel 36 when the flag panel 36 is moved between the flag displayed position and the retracted position.

With this guiding mechanism, the flag panel 36 can be moved between the flag displayed position and the retracted position stably without rattling. In this case, the dimensional accuracy between the guiding groove 46 and the slider 51 is set to be ±0.2 mm or smaller.

The link arm 49 and the slider 51 are set to be flush with the bottom panel portion 45 when the flag panel 36 is at the retracted position by being fitted in the sliding groove 52. As described above, when the flag panel 36 is also set to be flush with the bottom panel portion 45 when it is at the retracted position. Therefore, when the magnetic tape cartridge 15 is mounted on the flag-attached cell 20B as described later, the flag panel 36, the link arm 49, and the slider 51 are prevented from hindering the magnetic tape cartridge 15.

The spring 53 is connected to the slider 51. This spring 53 is a coil spring and urges the slider 51 in the direction indicated by the arrow X2. Therefore, in a state in which the magnetic tape cartridge 15 is not mounted, the slider 51 is urged by the spring 53 in the X2 direction, and hence the flag panel 36 is located at the flag displayed position. The spring 53 and the hinge 48 function as a rotating mechanism which causes the flag panel 36 to rotate between the flag displayed position and the retracted position.

When the flag panel 36 is positioned at the flag displayed position, the flag panel 36 is supported by the link arm 49, the slider 51, and the spring 53. As described above, the dimensional accuracy between the slider 51 and the sliding groove 52 is set with a degree of accuracy as high as ±0.2 mm or smaller. Therefore, the flag panel 36 is positioned at the flag displayed position with high degree of accuracy. Therefore, the positional accuracy of the flag 37 is improved, the relative error between the cell 14 and the transport robot 18 can be detected with high degree of accuracy, so that the transport accuracy of the magnetic tape cartridge 15 by the transport robot 18 can be enhanced.

The flag panel 36 configured as described above is moved to the retracted position by the magnetic tape cartridge 15 being inserted into the flag-attached cell 20B. More specifically, when the magnetic tape cartridge 15 is transported to the flag-attached cell 20B by the transport robot 18, and is inserted into the flag-attached cell 20B in the direction indicated by the arrow X1, the distal end portion of the magnetic tape cartridge 15 firstly comes into abutment with the flag panel 36 and presses the same.

The urging force that the spring 53 urges the flag panel 36 in the C1 direction is set to be smaller than an insertion force that the hand device 22 of the transport robot 18 inserts the magnetic tape cartridge 15 into the flag-attached cell 20B. Therefore, in association with the insertion of the magnetic tape cartridge 15 into the flag-attached cell 20B, the flag panel 36 is moved to the retracted position which does not hinder the mounting of the magnetic tape cartridge 15.

FIG. 16B illustrates a state in which the magnetic tape cartridge 15 (not illustrated) is state of being mounted in the flag-attached cell 20B. The flag panel 36, the link arm 49, and the slider 51 are located at the retracted position which does not hinder the mounting of the magnetic tape cartridge 15 in this mounted state. Therefore, in the flag-attached cell 20B in this embodiment as well, the magnetic tape cartridge 15 can be mounted in the flag-attached cell 20B.

In contrast, when the magnetic tape cartridge 15 mounted on the flag-attached cell 20B is taken out by the transport robot 18, the flag panel 36 is rotated in the C1 direction by the urging force of the spring 53 in association with the movement in the X2 direction of the magnetic tape cartridge 15. Then, in the state in which the magnetic tape cartridge 15 is removed from the flag-attached cell 20B completely, the flag panel 36 is positioned at the flag displayed position again so that the flag panel 36 can be recognized from the outside of the medium storing shelf 13.

As described above, in the case of the flag-attached cell 20B according to this embodiment as well, the magnetic tape cartridge 15 can be stored in the interior thereof, and the flag panel 36 can be brought into the state of being recognizable from the outside by taking out the magnetic tape cartridge 15. Therefore, by applying the flag-attached cell 20B in this embodiment, the efficiency of storage of the magnetic tape cartridge 15 with respect to the medium storing shelf 13 can be enhanced, and the downsizing of the library apparatus 10 is achieved.

Subsequently, a flag-attached cell 20C according to a third embodiment will be described.

Figure 18A:
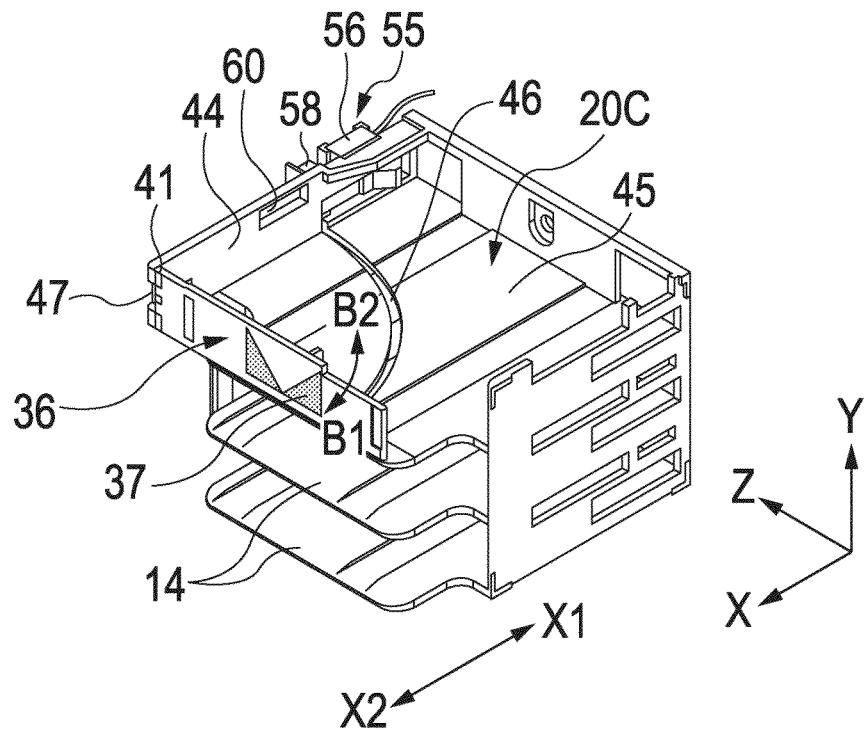
Figure 18B:
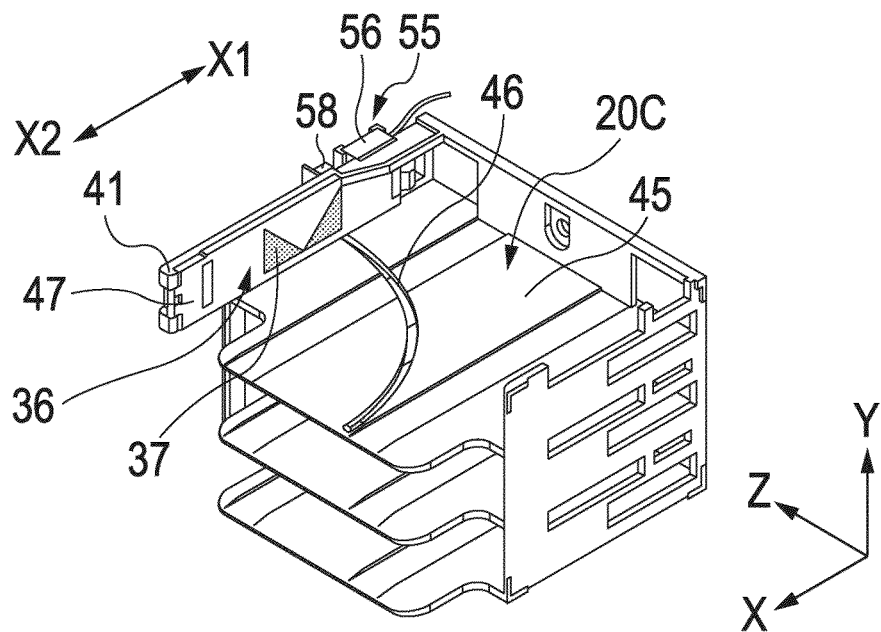

FIGS. 18A to 18B and FIG. 19 are drawings for explaining the flag-attached cell 20C according to the third embodiment. The flag-attached cell 20C according to this embodiment has the same basic configuration as the flag-attached cell 20A according to the first embodiment described above. However, the flag-attached cell 20C according to this embodiment is different from the first embodiment. A different point is that a first locking mechanism 55 restricts (locks) the position of the flag panel 36 to the retracted position from The first locking mechanism 55 includes a solenoid 56 and a locking strip 59. The solenoid 56 as the driving mechanism is disposed outside the side panel portion 44 which constitutes the flag-attached cell 20C as illustrated in FIGS. 19A to 19B. A solenoid holder 76 is formed on the outside surface of the side panel portion 44, and the solenoid 56 is fixed to the solenoid holder 76 with adhesion or the like.

Figure 20A:
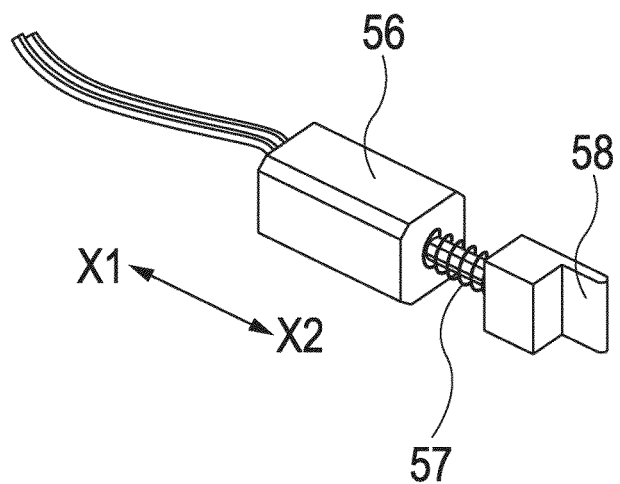
Figure 20B:
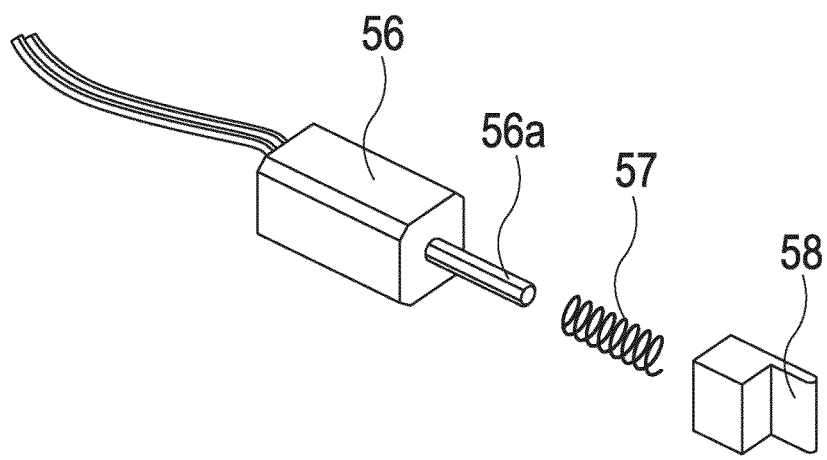

As illustrated in FIGS. 20A to 20B in an enlarged scale, the solenoid 56 has a structure in which a coil spring 57 is fitted on a shaft 56a and a hook-shaped (substantially L-shaped) locking claw 58 is fixed to a distal end portion thereof as illustrated in FIGS. 20A to 20B in an enlarge scale. Therefore, in a state in which the solenoid 56 is not supplied with power, the shaft 56a is extended in the X2 direction with respect to the solenoid body portion by an urging force of the coil spring 57. In contrast, when the power is supplied to the coil spring 57, the shaft 56a is retracted in the direction indicated by the arrow X1 in the drawing, and the locking claw 58 is also moved in the X1 direction in association with this.

Figure 21A:
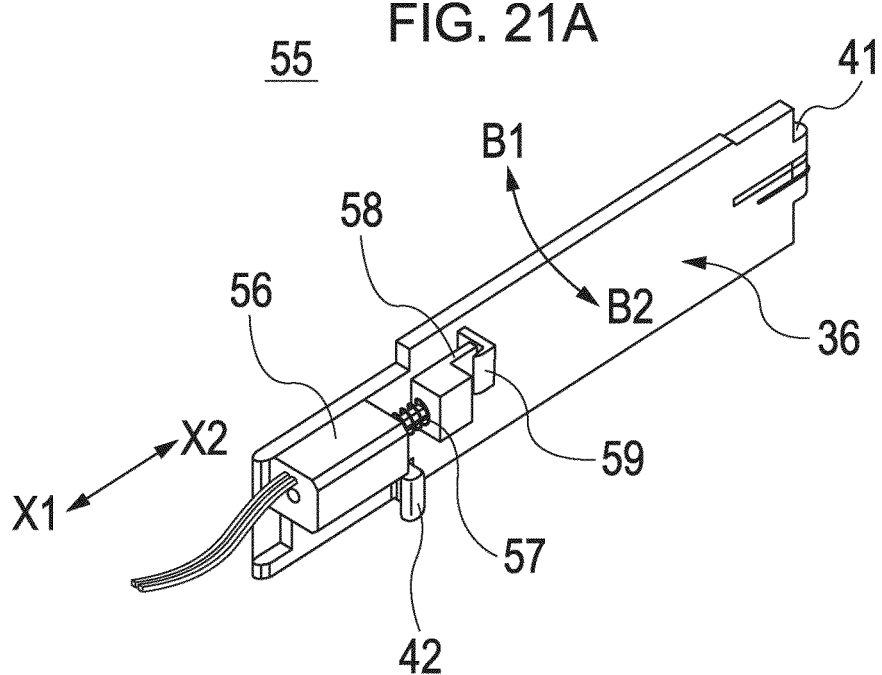
Figure 21B:
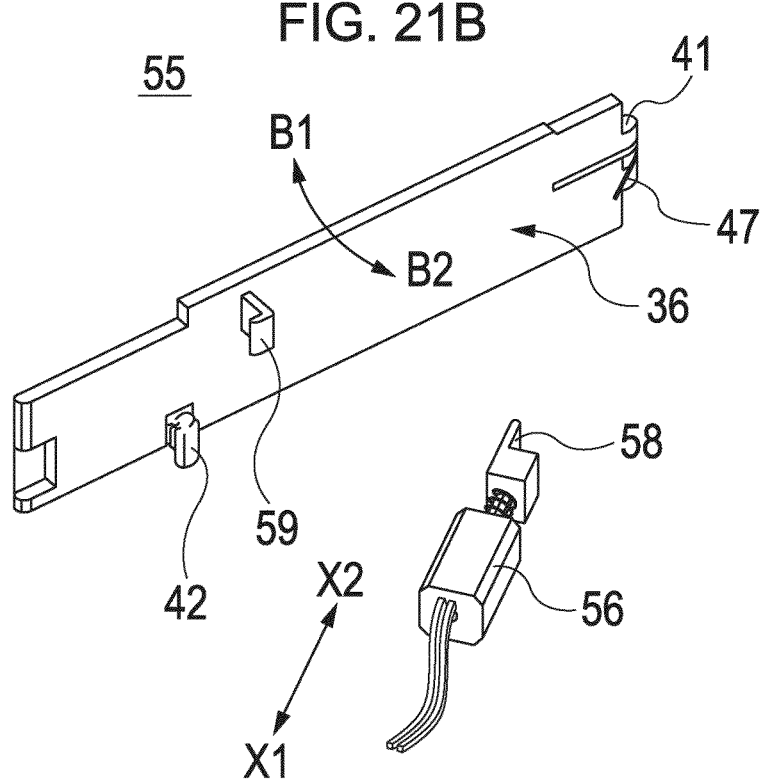

In contrast, the locking strip 59 is provided so as to project to the back side of the flag panel 36 as illustrated in FIGS. 21A to 21B. The locking strip 59 has a hook shape (substantially L-shape), and has a shape which is engageable with the locking claw 58 provided on the solenoid 56. The locking strip 59 may be formed integrally with the flag panel 36, and may be attached to the flag panel 36 as a member separate from the flag panel 36.

The side panel portion 44 includes an opening 60. When the flag panel 36 is positioned to the retracted position, the locking strip 59 projects to the outside of the side panel portion 44 via the opening 60. In addition, the locking strip 59 described above is arranged at a position opposing the opening 60. Therefore, the locking strip 59 projects to the outside of the side panel portion 44 from the opening 60 and engages with the locking claw 58 provided on the solenoid 56 at a time point when the flag panel 36 is moved toward the retracted position and reaches the retracted position.

FIG. 21A illustrates a state in which the locking claw 58 engages the locking strip 59. In this manner, by the engagement of the locking claw 58 and the locking strip 59, the flag panel 36 is restricted (locked) in position to the retracted position. FIG. 18B and FIG. 21A show a state in which the locking claw 58 engages the locking strip 59, and the flag panel 36 is locked at the retracted position. In this locked state, since the locking claw 58 is urged toward the locking strip 59 by the coil spring 57, the locking strip 59 is prevented from coming apart easily from the locking claw 58.

In contrast, in order to release the lock, the power is supplied to the solenoid 56. Accordingly, since the locking claw 58 is moved in the X1 direction and moved apart from the locking strip 59, the lock is released and a state of allowing the movement of the flag panel 36 is assumed. When the lock of the flag panel 36 by the first locking mechanism 55 is released, it is urged by the spring 47 as described above, and hence the flag panel 36 is moved to the flag displayed position.

In this manner, according to this embodiment, the flag panel 36 can be locked to the retracted position. In general, the retry for performing the error correction is performed at a frequency of once in several months. Therefore, the frequency to move the flag panel 36 to the flag displayed position to make the flag 37 to be recognizable from the outside may be once in several months as well.

In contrast, the frequency of mounting and demounting of the magnetic tape cartridges 15 with respect to the cells 14 including the flag-attached cells 20A-1 to 20A-3 is very high. Therefore, with the configuration in which the flag panel 36 is moved between the flag displayed position and the retracted position every time when the magnetic tape cartridges 15 are mounted and demounted with respect to the flag-attached cells 20A-1 to 20A-3, deterioration with time occurs on the hinge 41 and the position of engagement between the guide pin 42 and the guiding groove 46. When the rattling occurs in the flag panel 36 due to the deterioration with time, the accuracy of the error detection using the flag 37 may be lowered.

However, according to this embodiment, the flag panel 36 can be locked to the retracted position. Therefore, occurrence of the deterioration with time on the hinge 41 and the position of engagement between the guide pin 42 and the guiding groove 46 can be restrained, so that the maintenance of accuracy of the error detection using the flag 37 is achieved.

Also, when the magnetic tape cartridge 15 comes into abutment with the flag panel 36, scratches may be generated on the flag 37. When the abutment between the magnetic tape cartridge 15 and the flag panel 36 occurs frequently, the visibility of the image of the flag 37 picked up by the CCD 43 may be lowered by these scratches. However, the flag-attached cell 20C according to this embodiment may reduce the frequency of the abutment between the magnetic tape cartridge 15 and the flag panel 36 and occurrence of the scratch on the flag 37 may be restrained.

Subsequently, a flag-attached cell 20D according to a fourth embodiment will be described.

FIGS. 22A to 22C and FIG. 23 are drawings for explaining the flag-attached cell 20D according to the fourth embodiment. The flag-attached cell 20D according to this embodiment has the same basic structure as the flag-attached cell 20A according to the first embodiment as in the case of the flag-attached cell 20C according to the third embodiment described above, and has a second locking mechanism 80 for restricting (locking) the position of the flag panel 36 to the retracted position.

As described above, the first locking mechanism 55 provided on the flag-attached cell 20C according to the third embodiment is a mechanism for releasing the lock of the flag panel 36 by supplying the power to the solenoid 56. In contrast, the second locking mechanism 80 provided on the flag-attached cell 20D according to this embodiment does not release the lock electrically, but release the lock by the second locking mechanism 80 using the movement of the hand device 22.

Figure 23:
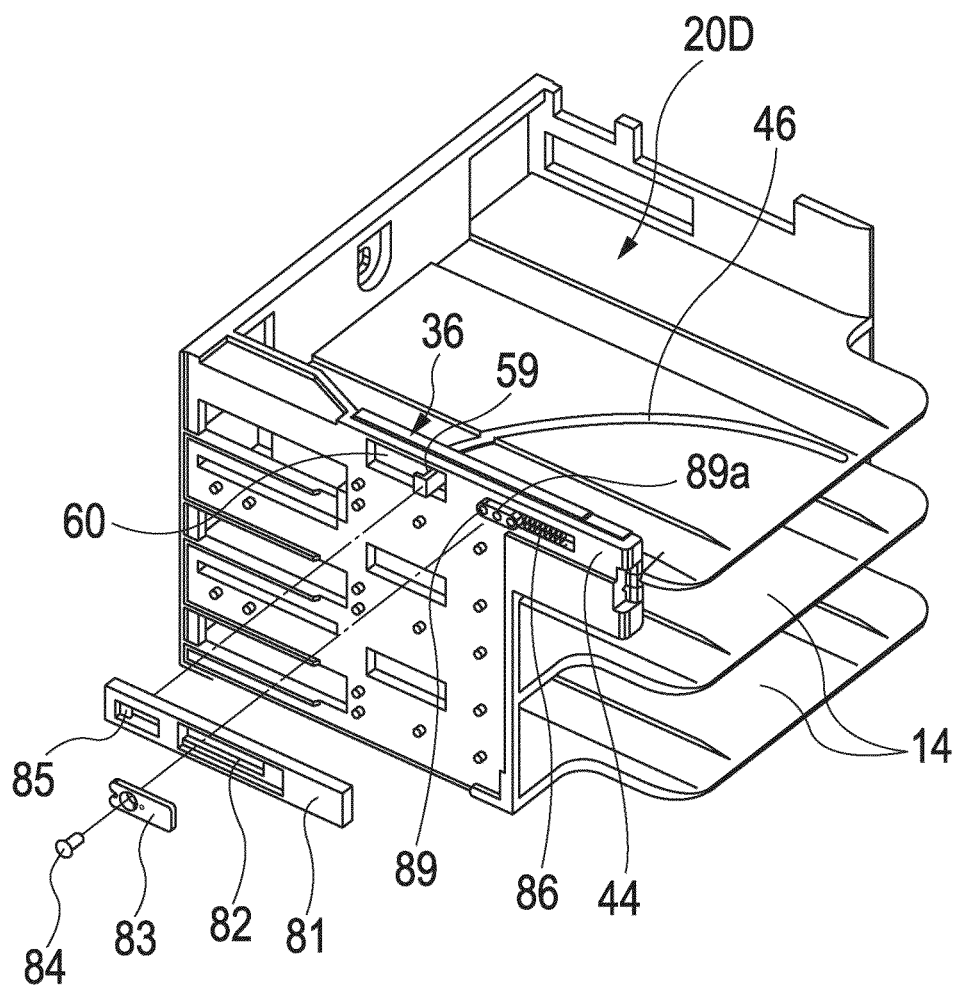
FIG. 23 is an exploded perspective view of the flag-attached cell provided in the library apparatus according to the fourth embodiment of the present invention.
Figure 24A:
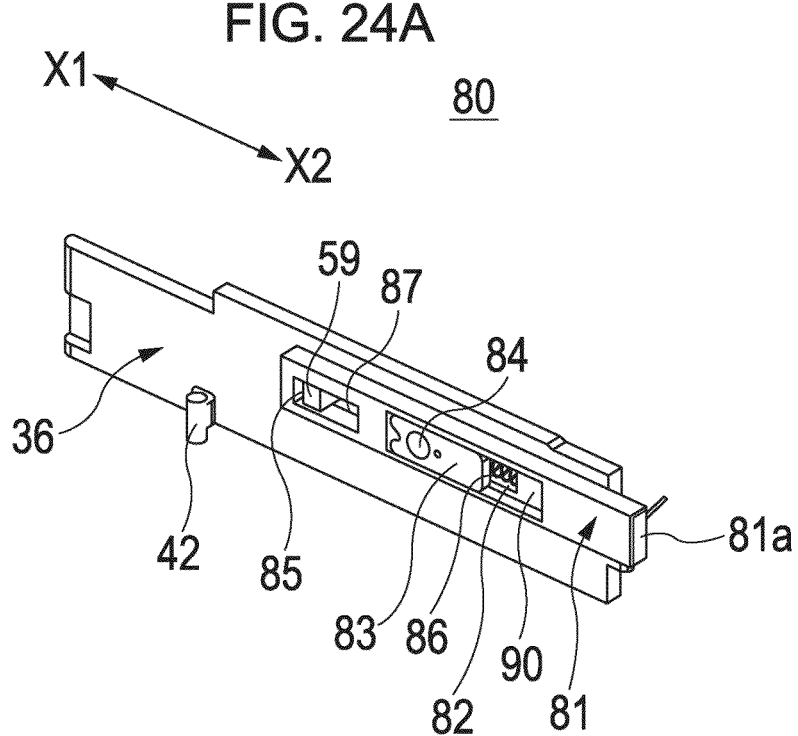
Figure 24B:
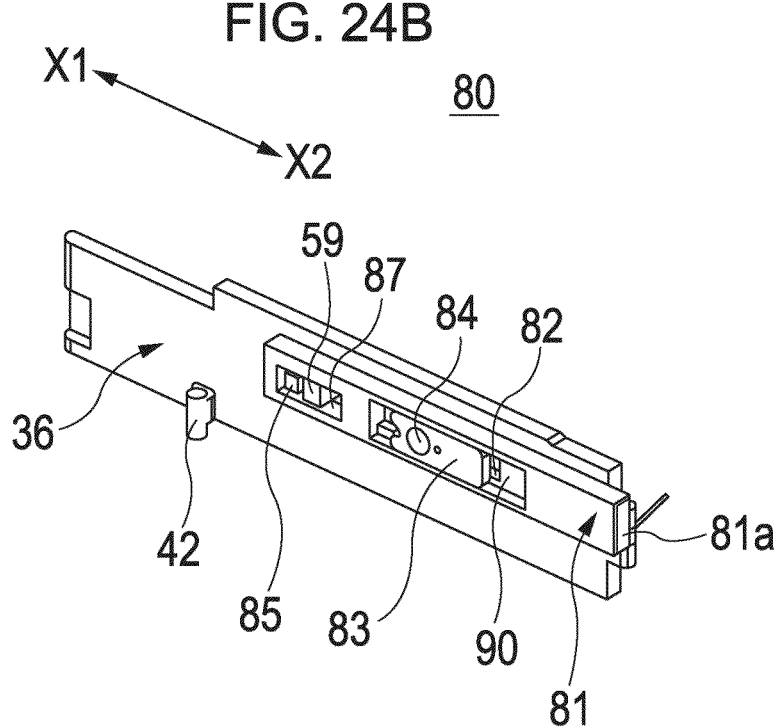

The second locking mechanism 80 includes the locking strip 59, a lock lever 81, a sliding guide panel 83, and a coil spring 86 (corresponding to the second urging member described in claims) as illustrated in FIGS. 24A to 24B. The second locking mechanism 80 is disposed on the outside of the side panel portion 44 as illustrated in FIG. 22C and FIG. 23. A guide projection 89 (see FIG. 23) is provided on the outside surface of the side panel portion 44, and the lock lever 81 is attached to the guide projection 89 so as to be slidable (slidable in X1 and X2 directions).

Figure 25A:
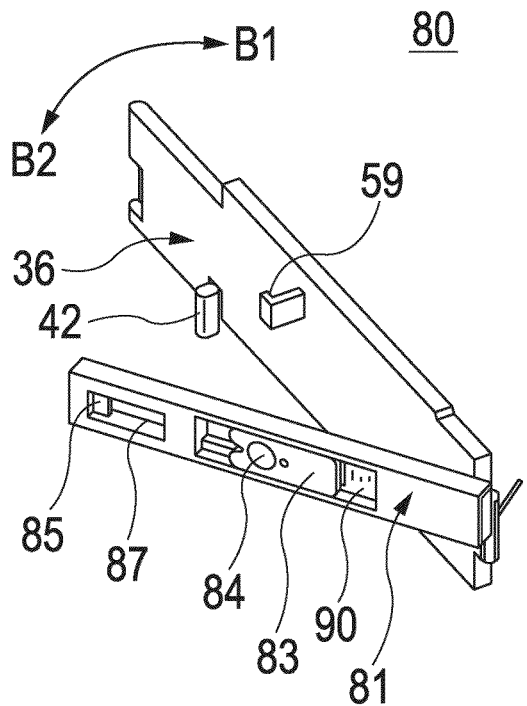
Figure 25B:
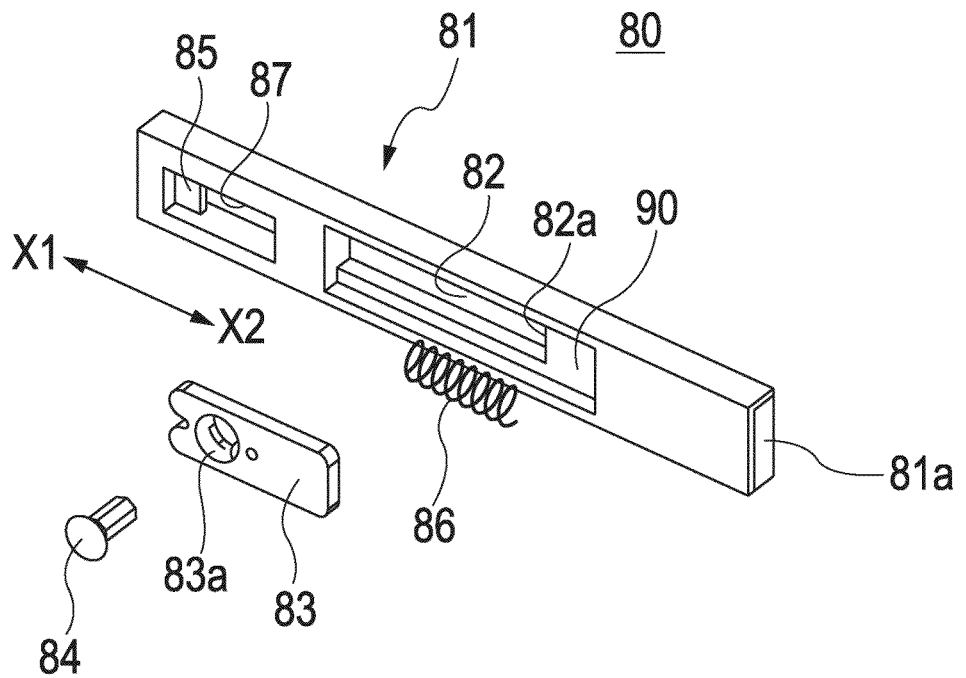

The lock lever 81 has a rectangular shape elongated in the X1, X2 directions. The lock lever 81 is formed of resin or metal. The lock lever 81 is formed with a sliding hole 82, an opening 87, a sliding groove 90 as illustrated in FIGS. 25A to 25B. The sliding hole 82 and the opening 87 are both elongated holes formed in the X1, X2 directions. The guide projection 89 formed on the side panel portion 44 described above engages the lock lever 81 by being inserted into the sliding hole 82. The guide projection 89 is movable in the sliding hole 82 relatively in the X1 and X2 directions. Therefore, the lock lever 81 is slidable with respect to the guide projection 89 in the X1, X2 directions.

A locking claw portion 85 is formed at an end portion of the opening 87 in the direction indicated by the arrow X1. The locking claw portion 85 restricts (locks) the position of the flag panel 36 by engaging the locking strip 59 provided on the flag panel 36 when the flag panel 36 is at the retracted position as described later.

The sliding groove 90 is formed at an edge portion of the lock lever 81 formed with the sliding hole 82. The sliding groove 90 allows the sliding guide panel 83 to slidably engage therewith. The coil spring 86 is mounted between an end portion 82a of the sliding hole 82 and the guide projection 89 inserted into the sliding hole 82.

In order to assemble the second locking mechanism 80, first of all, the lock lever 81 is attached to the guide projection 89 so that the guide projection 89 is inserted into the sliding hole 82. Then, the coil spring 86 is mounted between the end portion 82a of the sliding hole 82 and the guide projection 89 inserted into the sliding hole 82. Therefore, the coil spring 86 is brought into a state of being fitted to the sliding hole 82.

Subsequently, the sliding guide panel 83 is mounted into the sliding groove 90, and a through hole 83a provided on the sliding guide panel 83 and a screw hole 89a formed on the guide projection 89 are aligned, and then a fixing screw 84 is screwed into the screw hole 89a via the sliding guide panel 83. Accordingly, the sliding guide panel 83 is fixed to the guide projection 89, and is supported by the sliding guide panel 83 and the guide projection 89, so that the lock lever 81 is brought into a state of slidable in the directions indicated by the arrows X1 and X2 in the FIG. 22C.

Also, as described above, the coil spring 86 is disposed between the guide projection 89 inserted into the sliding hole 82 and the end portion 82a of the sliding hole 82, and the coil spring 86 urges the lock lever 81 against the guide projection 89 in the direction indicated by the arrow X2. In addition, in the state in which the lock lever 81 is attached to the side panel portion 44, the opening 87 is set so as to oppose the opening 60 formed on the side panel portion 44.

In the same manner as the third embodiment, when the flag panel 36 is retracted to the retracted position, the locking strip 59 projects to the outside of the side panel portion 44 via the opening 60. Therefore, the locking strip 59 projects to the outside of the side panel portion 44 from the opening 60 and engages with the locking claw portion 85 provided on the lock lever 81 at a time point when the flag panel 36 is moved toward the retracted position and reaches the retracted position. In this manner, by the engagement of the locking strip 59 and the locking claw portion 85, the flag panel 36 is restricted (locked) in position to the retracted position.

FIGS. 22B to 22C and FIG. 24A show a state in which the locking strip 59 engages the locking claw portion 85. In this locked state, since the locking claw portion 85 is urged toward the locking strip 59 by the coil spring 86, the locking strip 59 is prevented from coming apart easily from the locking claw portion 85.

In contrast, in order to release the lock, a distal end portion 81a as the end portion of the shaft 31 in the X2 direction is pressed in the X1 direction. Accordingly, the lock lever 81 moves in the X1 direction against the urging force of the coil spring 86, and the locking claw portion 85 moves in the X1 direction and moves apart from the locking strip 59 in association therewith. Accordingly, the lock of the flag panel 36 by the second locking mechanism 80 is released and the flag panel 36 is brought into a state in which the movement is allowed. When the lock of the flag panel 36 is released, the flag panel 36 is urged by the spring 47, and is moved to the flag displayed position illustrated in FIG. 22A.

In this embodiment, the pressing operation of the lock lever 81 for releasing the lock is executed by the hand device 22. As described above, the hand device 22 includes a pair of gripping arms 24, and the claws 24a provided at the distal ends of the gripping arms 24 are engaged with the receiving portions 15a of the magnetic tape cartridges 15, so that mounting and demounting of the magnetic tape cartridges 15 are performed with respect to the cells 14 and the flag-attached cells 20A-1 to 20A-3.

In this embodiment, an operating portion 88 (see FIG. 26) which can press the distal end portion 81a is provided on the gripping arm 24 on the side corresponding to the position where the lock lever 81 is disposed. This operating portion 88 is provided at a position which is not engaged with the distal end portion 81a when the magnetic tape cartridges 15 are mounted or demounted with respect to the flag attached cells 20A-1 to 20A-3.

Figure 26:
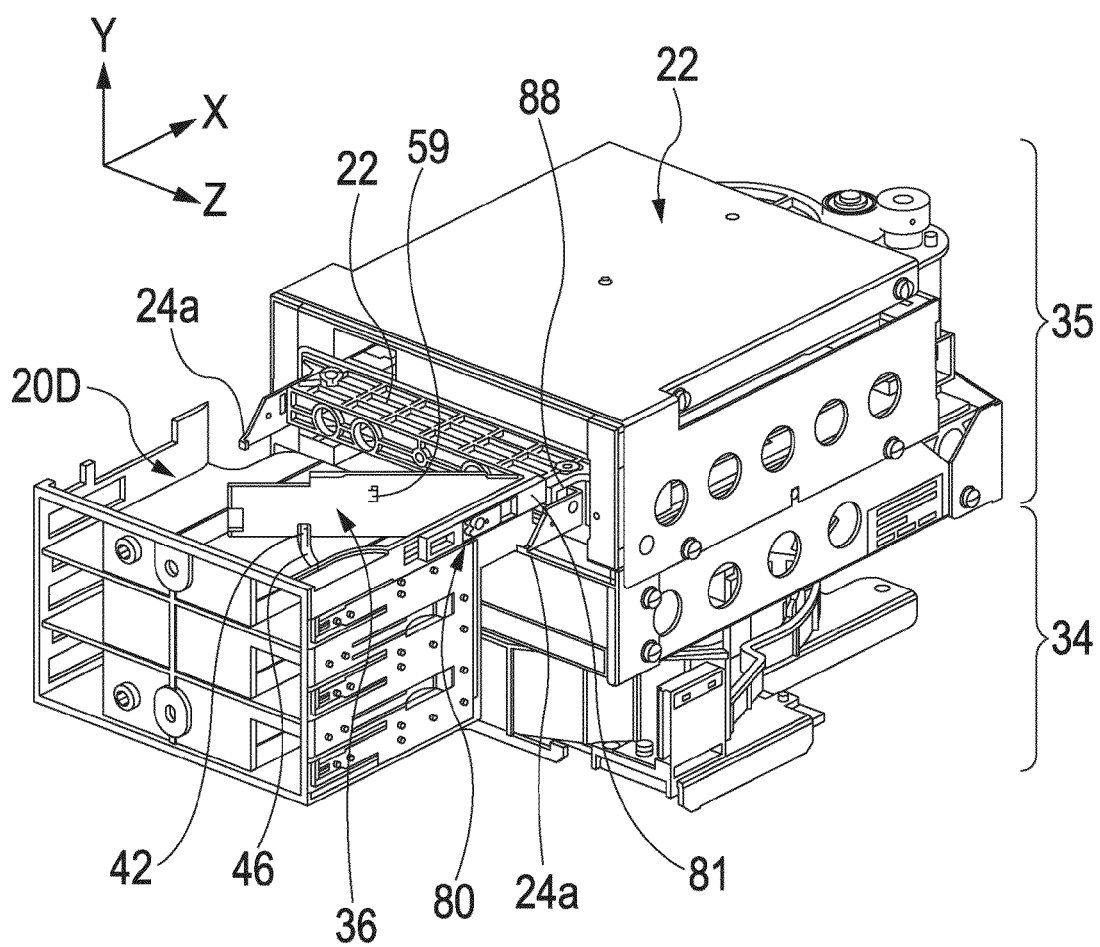
FIG. 26 is a perspective view for explaining a lock releasing operation of the second locking mechanism provided in the library apparatus according to the fourth embodiment of the present invention.

However, when the flag reading process is executed, the control board 61 controls the hand device 22 so that the gripping arms 24 extend to positions deeper than the positions where the mounting and demounting of the magnetic tape cartridge 15 are normally performed. Accordingly, the operating portion provided on the gripping arm 24 presses the distal end portion 81a in the X1 direction, whereby the lock of the flag panel 36 by the lock lever 81 is released, so that the flag panel 36 can be brought into a state in which the movement is allowed. FIG. 26 illustrates a state in which the operating portion 88 provided on the gripping arm 24 presses the distal end portion 81a of the lock lever 81, whereby the lock of the flag panel 36 by the second locking mechanism 80 is released.

As described above, since the flag-attached cell 20D according to this embodiment includes the second locking mechanism 80, the flag panel 36 can be locked to the retracted position. Therefore, occurrence of the deterioration with time on the hinge 41 and the position of engagement between the guide pin 42 and the guiding groove 46 can be restrained, so that the maintenance of accuracy of the error detection using the flag 37 is achieved. Also, generation of scratches on the flag 37 is retrained, and hence lowering of the visibility of the image of the flag 37 picked up by the CCD 43 is prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A library apparatus comprising:
   a medium storing shelf having a plurality of cells for storing a recording medium;
   a recording and reproducing device for performing a recording and reproducing process on the recording medium;
   a transporting device for transporting the recording medium between the medium storing shelf and the recording and reproducing device;
   a flag provided on at least one of the cells and used for obtaining position information for transporting the recording medium; and
   a flag moving mechanism for moving the flag to a retracted position which does not hinder mounting of the recording medium into the at least one of the cells, wherein the flag moving mechanism includes:
   a flag panel provided with the flag,
   a rotating mechanism configured to rotate the flag panel; and
   a locking mechanism configured to lock the flag panel at the retracted position, wherein the locking mechanism includes:
   a locking strip provided on the flag panel, and
   a driving device provided with a locking claw, wherein:
   the locking strip engages the locking claw when the flag panel is at the retracted position to lock the flag panel at the retracted position, and
   the driving device moves the locking claw and allows the movement of the flag panel by moving the locking claw away from the locking strip.

2. The library apparatus according to claim 1, wherein the flag moving mechanism includes a guiding mechanism for guiding the movement of the flag panel to the retracted position.

3. The library apparatus according to claim 1, wherein the flag moving mechanism includes a first urging member configured to urge the flag panel to a position where the flag is displayed.

4. The library apparatus according to claim 1, wherein the rotating mechanism is configured to rotate the flag panel toward a side panel portion of the at least one of the cells.

5. The library apparatus according to claim 1, wherein the rotating mechanism is configured to rotate the flag panel toward a bottom panel portion of the at least one of the cells.

6. The library apparatus according to claim 1, wherein the driving device is a solenoid provided with the locking claw.

7. The library apparatus according to claim 1, wherein the driving device includes:
   a lock lever mounted on the at least one of the cells so as to be capable of sliding movement and provided with the locking claw; and
   a second urging member configured to urge the lock lever in the direction to cause the locking claw to engage the locking strip, and
   the locking claw is moved away from the locking strip to allow the movement of the flag panel by moving the lock lever against an urging force of the second urging member when the transporting device takes the recording medium from the medium storing shelf.

\* \* \* \* \*